US006630760B2

(12) United States Patent
Fulton et al.

(10) Patent No.: US 6,630,760 B2
(45) Date of Patent: Oct. 7, 2003

(54) COAXIAL STARTER MOTOR ASSEMBLY HAVING A RETURN SPRING SPACED FROM THE PINION SHAFT

(75) Inventors: David A. Fulton, Anderson, IN (US); James D. Stuber, Fishers, IN (US)

(73) Assignee: Delco Remy America, Inc., Anderson, IN (US)

( * ) Notice: Subject to any disclaimer, the term of this patent is extended or adjusted under 35 U.S.C. 154(b) by 63 days.

(21) Appl. No.: 10/002,167

(22) Filed: Dec. 5, 2001

(65) Prior Publication Data

US 2003/0102737 A1 Jun. 5, 2003

(51) Int. Cl.[7] .......................... H02K 7/10; F02N 11/08; F02N 15/02

(52) U.S. Cl. ...................... 310/75 R; 290/38 R; 74/7 A

(58) Field of Search ............................ 290/38 C, 38 R, 290/48; 74/6, 7 A, 7 R; 310/75 R, 83

(56) References Cited

U.S. PATENT DOCUMENTS

| | | | |
|---|---|---|---|
| 1,499,862 A | 7/1924 | Eichenberg | 74/7 R |
| 1,546,872 A | 7/1925 | Vernet | 74/6 |
| 1,756,068 A | 4/1930 | Richards | 74/7 R |

(List continued on next page.)

FOREIGN PATENT DOCUMENTS

| | | |
|---|---|---|
| EP | 0 384 808 A1 | 8/1990 |
| EP | 0 387 073 B1 | 9/1993 |
| EP | 0 649 984 A1 | 4/1995 |
| FR | 2 566 868 A1 | 1/1986 |
| FR | 2 781 014 A1 | 1/2000 |
| JP | 1-208564 | 8/1989 |
| JP | 8-100749 | 4/1996 |

OTHER PUBLICATIONS

U.S. patent application Ser. No. 09/804,183, Fulton et al., filed Mar. 13, 2001.

U.S. patent application Ser. No. 10/002,166, Fulton et al., filed Dec. 5, 2001.

*Primary Examiner*—Nestor Ramirez
*Assistant Examiner*—Judson H. Jones
(74) *Attorney, Agent, or Firm*—Finnegan, Henderson, Farabow, Garrett & Dunner, L.L.P.

(57) ABSTRACT

A starter motor assembly is provided. A motor housing encloses an electrical motor having a rotatable armature shaft. A rotatable drive shaft is provided that is engageably linked with the armature shaft. A pinion assembly is also provided, which includes a pinion that is engageable with the drive shaft for turning a flywheel of an engine. A solenoid assembly is provided, which includes a plunger. The plunger, when the solenoid assembly is energized, is moved in an axial direction to close electrical contacts to start the electrical motor and to move the pinion into-engagement with the engine flywheel. Once the engine is cranked and the solenoid is deenergized, a return spring moves the pinion away from engagement with the engine flywheel. The return spring of the present invention moves the pinion without utilizing contact between the spring and the pinion (or any pinion shaft) to move the pinion away from engagement. Thus, the spring may be positioned around the pinion shaft without contacting the pinion shaft.

26 Claims, 14 Drawing Sheets

U.S. PATENT DOCUMENTS

| | | | | |
|---|---|---|---|---|
| 1,758,233 | A | 5/1930 | McGrath | 74/6 |
| 1,793,459 | A | 2/1931 | Benfield | 74/6 |
| 1,883,331 | A | 10/1932 | Bijur | 74/6 |
| 2,082,121 | A | 6/1937 | Rypinski | 318/471 |
| 2,141,178 | A | 12/1938 | Dyer | 74/7 A |
| 2,839,935 | A | 6/1958 | Hartzell et al. | 74/6 |
| 2,944,428 | A | 7/1960 | Antonidis et al. | 74/7 R |
| 3,708,682 | A | 1/1973 | Erwin, Jr. | 290/37 R |
| 3,733,494 | A | 5/1973 | Erwin, Jr. | 290/38 R |
| 3,774,047 | A | 11/1973 | Erwin, Jr. | 290/38 R |
| 3,875,805 | A | 4/1975 | Toulier | 74/7 R |
| 3,974,703 | A | 8/1976 | Strozinski | 74/6 |
| 4,149,424 | A | 4/1979 | Bowcott | 74/7 A |
| 4,191,937 | A | 3/1980 | Koehler et al. | 335/230 |
| 4,208,922 | A | 6/1980 | Mortensen | 74/7 R |
| 4,305,002 | A | 12/1981 | Mortensen | 290/38 R |
| 4,308,462 | A | 12/1981 | McMillen | 290/38 R |
| 4,326,429 | A | 4/1982 | Mortensen | 290/38 R |
| 4,330,713 | A | 5/1982 | Greenwod | 290/48 |
| 4,418,289 | A | 11/1983 | Mortensen | 307/142 |
| 4,479,394 | A | 10/1984 | Greenwood et al. | 74/7 R |
| 4,540,962 | A | 9/1985 | Gresley et al. | 335/131 |
| 4,551,630 | A | 11/1985 | Stahura et al. | 290/38 R |
| 4,586,245 | A | 5/1986 | Gresley et al. | 29/602.1 |
| 4,731,543 | A | 3/1988 | Buetemeister et al. | 290/38 R |
| 4,737,654 | A | 4/1988 | Morishita et al. | 290/48 |
| 4,744,258 | A | 5/1988 | Volino | 74/7 R |
| 4,755,689 | A | 7/1988 | Porter | 290/38 R |
| 4,760,274 | A | 7/1988 | Isozumi | 290/48 |
| 4,777,836 | A | 10/1988 | Giometti | 74/6 |
| 4,785,679 | A | 11/1988 | Weber et al. | 74/7 R |
| 4,790,536 | A | 12/1988 | Deger | 273/121 A |
| 4,800,766 | A | 1/1989 | Isozumi et al. | 74/7 E |
| 4,838,100 | A | 6/1989 | Tanaka | 74/7 A |
| 4,852,417 | A | 8/1989 | Tanaka | 74/7 E |
| 4,862,027 | A | 8/1989 | Isozumi et al. | 310/99 |
| 4,869,354 | A | 9/1989 | Brazier | 192/69.9 |
| 4,873,607 | A | 10/1989 | Yamamoto | 361/210 |
| 4,902,904 | A | 2/1990 | Isozumi | 290/48 |
| 4,907,464 | A | 3/1990 | Isozumi | 74/7 A |
| 4,912,991 | A | 4/1990 | Giometti | 74/6 |
| 4,918,324 | A | 4/1990 | Isozumi | 290/48 |
| 4,923,229 | A | 5/1990 | Isozumi | 290/48 |
| 4,924,108 | A | 5/1990 | Isozumi | 290/48 |
| 4,924,717 | A | 5/1990 | Aimo | 74/7 R |
| 4,926,706 | A | 5/1990 | Isozumi | 74/7 A |
| 4,941,366 | A | 7/1990 | Isozumi | 74/6 |
| 4,944,192 | A | 7/1990 | Morishita et al. | 74/6 |
| 4,945,777 | A | 8/1990 | Isozumi | 74/7 E |
| 4,947,052 | A | 8/1990 | Isozumi | 290/48 |
| 4,954,733 | A | 9/1990 | Isozumi | 310/71 |
| 4,962,340 | A | 10/1990 | Isozumi | 290/48 |
| 4,970,908 | A | 11/1990 | Isozumi et al. | 74/7 E |
| 4,985,637 | A | 1/1991 | Isozumi | 290/48 |
| 4,987,786 | A | 1/1991 | Morishita et al. | 74/7 C |
| 4,989,467 | A | 2/1991 | Morishita et al. | 74/6 |
| 4,990,874 | A | 2/1991 | Shiroyama | 335/126 |
| 5,012,686 | A | 5/1991 | Morishita et al. | 74/7 A |
| 5,013,950 | A | 5/1991 | Isozumi | 310/83 |
| 5,014,563 | A | 5/1991 | Isozumi | 74/7 R |
| 5,023,466 | A | 6/1991 | Isozumi | 290/48 |
| 5,036,213 | A | 7/1991 | Isozumi | 290/48 |
| 5,044,212 | A | 9/1991 | Isozumi et al. | 74/7 A |
| 5,052,235 | A | 10/1991 | Isozumi | 74/7 E |
| 5,067,357 | A | 11/1991 | Isozumi | 74/7 E |
| 5,076,109 | A | 12/1991 | Isozumi | 74/7 A |
| 5,081,874 | A | 1/1992 | Isozumi | 74/7 A |
| 5,081,875 | A | 1/1992 | Isozumi et al. | 74/7 R |
| 5,084,631 | A | 1/1992 | Shiroyama | 290/48 |
| 5,086,658 | A | 2/1992 | Isozumi | 74/7 E |
| 5,097,715 | A | 3/1992 | Isozumi | 74/7 E |
| 5,099,703 | A | 3/1992 | Isozumi | 74/6 |
| 5,105,670 | A | 4/1992 | Isozumi et al. | 74/6 |
| 5,111,705 | A | 5/1992 | Isozumi | 74/6 |
| 5,111,706 | A | 5/1992 | McMillen | 74/7 C |
| 5,118,960 | A | 6/1992 | Sasamoto et al. | 290/48 |
| 5,126,583 | A | 6/1992 | Isozumi et al. | 290/48 |
| 5,129,271 | A | 7/1992 | Isozumi et al. | 74/7 R |
| 5,130,586 | A | 7/1992 | Miyaji et al. | 310/83 |
| 5,154,089 | A | 10/1992 | Konishi | 74/7 E |
| 5,154,090 | A | 10/1992 | Konishi | 74/7 E |
| 5,156,057 | A | 10/1992 | Isozumi | 74/7 E |
| 5,157,978 | A | 10/1992 | Morishita et al. | 74/7 E |
| 5,195,389 | A | 3/1993 | Isozumi | 74/7 E |
| 5,196,727 | A | 3/1993 | Isozumi et al. | 290/48 |
| 5,197,342 | A | 3/1993 | Nakagawa | 74/7 A |
| 5,208,482 | A | 5/1993 | Isozumi | 290/48 |
| 5,255,644 | A | 10/1993 | Mills et al. | 123/179.31 |
| 5,291,861 | A | 3/1994 | Bartlett | 123/179.31 |
| 5,349,319 | A | 9/1994 | Isozumi et al. | 335/274 |
| 5,367,913 | A | 11/1994 | Yumiyama et al. | 74/7 A |
| 5,370,009 | A | 12/1994 | Isozumi | 74/7 C |
| 5,390,555 | A | 2/1995 | Gotou et al. | 74/7 R |
| 5,471,890 | A | 12/1995 | Shiga et al. | 74/7 E |
| 5,473,956 | A | 12/1995 | Murata et al. | 74/7 E |
| 5,475,270 | A | 12/1995 | McRoy | 307/10.6 |
| 5,505,169 | A | 4/1996 | Mummert et al. | 123/179.3 |
| 5,549,011 | A | 8/1996 | Shiga et al. | 74/7 E |
| 5,557,976 | A | 9/1996 | Moribayashi et al. | 74/7 E |
| 5,760,487 | A | 6/1998 | Kimura et al. | 290/48 |
| 5,839,318 | A | 11/1998 | Kimura et al. | 74/7 R |
| 5,848,552 | A | 12/1998 | Mine et al. | 74/7 E |
| 5,937,696 | A | 8/1999 | Ohya et al. | 74/7 A |
| 5,945,742 | A | 8/1999 | Araki et al. | 290/38 R |
| 6,109,122 | A | 8/2000 | Bori et al. | 74/7 E |
| 6,268,670 | B1 * | 7/2001 | Kuragaki et al. | 310/75 R |
| 6,286,378 | B1 * | 9/2001 | Kamei et al. | 74/7 A |

* cited by examiner

COAXIAL STARTER MOTOR ASSEMBLY HAVING A RETURN SPRING SPACED FROM THE PINION SHAFT

DESCRIPTION OF THE INVENTION

1. Field of the Invention

This invention relates to a starter motor assembly for starting an engine and, more particularly, to a starter motor assembly that has a return spring spaced from a pinion assembly of the starter motor assembly. This application is being filed concurrently with U.S. patent application Ser. No. 10/022,166, entitled Engagement and Disengagement Mechanism for a Coaxial Starter Motor Assembly, with inventors David A. Fulton and James D. Stuber, and assigned to Delco Remy America, Inc.

2. Background of the Invention

Starter motor assemblies to assist in starting engines, such as engines in vehicles, are well known. The conventional starter motor assembly broadly includes an electrical motor and a drive mechanism, which generally includes a mechanism for engaging and disengaging a pinion-type gear with an engine flywheel. The electrical motor is energized by a battery upon the closing of an ignition switch. The drive mechanism transmits the torque of the electrical motor through various components to the engine flywheel, thereby cranking the engine until the engine starts.

In greater detail, the closing of the ignition switch (typically by turning a key) energizes a solenoid with low current. Energization of the solenoid moves a metal solenoid shaft or plunger in an axial direction. The movement of the solenoid plunger closes electrical contacts, thereby applying full power to the electrical motor. The movement of the solenoid plunger also biases a pinion-type gear into engagement with a ring gear of the engine flywheel. Once the vehicle engine is started, the operator of the vehicle will open the ignition switch. The solenoid is thus turned off (i.e., deenergized), but the electrical contacts are still closed. To prevent run-on of the electrical motor, and subsequent damage, the engagement and disengagement mechanism must be designed to break the electrical contacts and disengage the pinion-type gear from the engine flywheel.

Starter motors assemblies can be either “biaxial” or “coaxial.” These terms relate to the location of the solenoid and solenoid plunger with respect to the armature shaft of the electrical motor. In a biaxial starter motor, the solenoid and the solenoid plunger are attached to the motor casing, with the solenoid plunger spaced away from and generally parallel to the armature shaft. In a coaxial starter motor, the solenoid is typically placed in the motor casing so that the solenoid plunger is aligned in the same axis with the armature shaft. The coaxial assembly is considered to be more compact and universally adaptable than the biaxial assembly. The present invention is directed to a coaxial assembly.

Once the electrical contacts are closed and full power is applied from the battery to the electrical motor, the motor's armature shaft subsequently rotates at a high speed. A planetary gear assembly, coupled to the armature shaft, reduces the speed of rotation of the armature shaft. The planetary gear assembly includes a drive shaft that rotates at that reduced speed. The end of the drive shaft opposite the planetary gear assembly is coupled with a pinion, preferably by a pinion shaft. Thus, the pinion rotates due to the rotation of the planetary gear drive shaft, which in turn rotates (again, at a reduced speed) due to the rotation of the electrical motor armature shaft.

Starter motor assemblies typically include a one-way clutch that is utilized to allow the planetary gear drive shaft to rotate at higher speeds and/or in the opposite direction from the cranking of the engine and to ensure that these higher rotational speeds or opposite directional velocities are not transmitted to the electrical motor armature shaft. In coaxial starter motor assemblies, the clutch is sometimes built around a ring gear positioned between the planetary gear drive shaft and the electrical motor armature shaft.

As stated above, energization of the solenoid also moves the solenoid plunger in the axial direction to move the pinion into engagement with the engine flywheel. In coaxial starter motor assemblies, typically the plunger is coupled to the pinion such that the movement of the plunger in turn moves the pinion in that same axial direction.

The pinion includes a plurality of gear teeth on its external surface for engagement with the engine flywheel. Thus, when the pinion is biased toward engagement of the flywheel and is rotating, the engagement of the pinion with the ring gear of the flywheel in turn causes the flywheel to rotate, thereby cranking the vehicle engine.

For the energization of the solenoid assembly to move the solenoid plunger and hold the plunger for pinion-flywheel engagement, solenoid assemblies typically utilize two coils, a pull-in coil and a hold-in coil. In particular, both coils energize the plunger of the solenoid assembly to bias the plunger in the axial direction for engagement with the engine flywheel. The hold-in coil then holds the plunger in place to hold the pinion in the engagement position with the ring gear of the engine flywheel.

After the operator of the vehicle opens the ignition switch, which deenergizes the solenoid assembly, the magnetic field that caused the solenoid plunger to move decreases and at some point is overcome by a return spring. In particular, the return spring continually pushes against the pinion away from engagement with the engine flywheel. However, it is only at those times when the force of the return spring is greater than the magnetic field generated by the solenoid biasing the plunger toward the flywheel, as well as an axial thrust force, that the pinion is moved away from engagement from the flywheel.

Conventional return springs often contact the pinion or some part rigidly connected with the pinion, such as the pinion shaft or the drive shaft, in order to exert a force on the pinion to bias the pinion away from the engine flywheel. For example, U.S. Pat. No. 6,109,122, issued to Bori et al. (“the Bori et al. patent”), and assigned to Delco Remy International, discloses a pinion shaft that includes a pinion spring surrounding it, with a pinion engaging one end of the pinion shaft. U.S. Pat. No. 4,924,717, issued to Aimo, discloses a spring fitted around an appendage of the pinion. U.S. Pat. No. 4,838,100, issued to Tanaka, discloses a spring that surrounds the pinion shaft between a bearing, which is rigidly fitted on the inner wall of tubular inner contact member in which the pinion shaft is disposed, and a retaining ring, which is secured to the periphery of the rear end portion of the pinion shaft. Similarly, U.S. Pat. No. 4,852,417, issued to Tanaka, discloses that the pinion shaft is returned by the action of a spring that is provided around the rear end of the pinion shaft.

Thus, the return springs discussed above will be in constant contact with the pinion or the pinion shaft and, thus, will be pushing against a part that is rotating. In some instances, the contact between the return spring and the pinion or the pinion shaft causes the return spring to rotate with the pinion or the pinion shaft as well.

Starter motor assemblies having return springs that contact the pinion or the pinion shaft suffer from several disadvantages. In particular, one disadvantage is the wear on the return spring due to the constant contact and/or rotation with the pinion or the pinion shaft. In addition, the rotation of the return spring may occur at high speeds, which can result in breakage of the spring.

SUMMARY OF THE INVENTION

The present invention is directed to a starter motor assembly having a housing. An electrical motor is provided in the housing having a rotatable armature shaft. A rotatable drive shaft is provided that is engageably linked with the armature shaft. A pinion assembly is provided in the housing that is engageable at one end with the drive shaft. The pinion assembly includes a pinion at the other end engageable with a flywheel of an engine. A solenoid assembly is provided in the housing for selectively energizing the electrical motor, wherein the solenoid assembly is coaxial with the drive shaft. The solenoid assembly includes a plunger having a bore. The plunger is engageable with the pinion assembly to move the pinion assembly including the pinion into engagement with the flywheel. A return spring is provided that is positioned at least in part within the bore of the plunger of the solenoid assembly for moving the pinion assembly including the pinion away from engagement with the flywheel. The return spring is spaced from the pinion assembly. Energization of the solenoid assembly moves the plunger to move the pinion assembly to engage the pinion with the flywheel. Upon deenergization of the solenoid assembly, the return spring moves the pinion assembly which moves the pinion from engagement with the flywheel.

In one embodiment, the starter motor assembly includes a contact member that engages the plunger and the pinion assembly so that movement of the plunger moves the pinion assembly. The contact member is positioned within the bore of the plunger and contacts a contact surface of the plunger. The contact member is further positioned within a groove formed around an external surface of the pinion assembly. A first end of the return spring pushes against the contact member. Upon deenergization of the solenoid assembly, the return spring moves against the contact member which in turn moves the pinion assembly to move the pinion from engagement with the flywheel.

In one embodiment, the contact member is penannular in shape. In another embodiment, the contact member is annular in shape. The contact member is preferably made of a case hardened steel, stainless steel, or brass.

In one embodiment, the starter motor assembly further comprises a plunger stop assembly provided around the pinion assembly. The plunger stop assembly includes a groove formed in a surface opposite a surface facing the flywheel. A second end of the return spring, which is opposite the first end of the return spring, pushes against the groove formed in the plunger stop assembly.

In one embodiment, the rotatable drive shaft is part of a planetary gear assembly provided in the housing. The planetary gear assembly includes a plurality of planetary gears engaged with the armature shaft. Each planetary gear is rotatable on a respective pin, and the pins are linked to the rotatable drive shaft.

In one embodiment, the starter motor assembly further includes a clutch assembly provided in the housing engageable with the drive shaft of the planetary gear assembly and the armature shaft. The clutch assembly has an inner clutch piece, an integrated clutch shell including an outer clutch piece, and rotation control means provided between the outer clutch piece and the inner clutch piece for preventing rotation of the inner clutch piece in a first direction and allowing rotation of the inner clutch piece in a second direction.

The present invention is also directed to a starter motor assembly including a housing. An electrical motor is provided in the housing that has a rotatable armature shaft. A rotatable drive shaft is provided that is engageably linked to the armature shaft. A pinion assembly is provided in the housing. The pinion assembly includes a pinion shaft that is engageable at one end with the drive shaft and includes a pinion at the other end engageable with a flywheel of an engine. The pinion shaft further includes a groove formed around an external surface of the pinion shaft. A solenoid assembly is provided in the housing for selectively energizing the electrical motor, wherein the solenoid assembly is coaxial with the drive shaft. The solenoid assembly includes a plunger having a bore. The plunger is engageable with the pinion assembly to move the pinion into engagement with the flywheel. A return spring is provided that is positioned around the pinion shaft without contacting the pinion shaft. The return spring is positioned at least in part within the bore of the plunger of the solenoid assembly. A contact member is provided that is positioned within the groove formed around the external surface of the pinion shaft. The contact member is also positioned within the bore of the plunger of the solenoid assembly. Energization of the solenoid assembly moves the plunger which in turn moves the contact member which in turn moves the pinion assembly to thereby engage the pinion with the flywheel. Upon deenergization of the solenoid assembly, the return spring moves the contact member which in turn moves the pinion assembly to move the pinion from engagement with the flywheel.

The present invention is also directed to a starter motor assembly including a housing. An electrical motor is provided in the housing that has a rotatable armature shaft. A planetary gear assembly is also provided in the housing. The planetary gear assembly includes a rotatable drive shaft that is engageably linked to the armature shaft. The planetary gear assembly also includes a plurality of planetary gears engaged with the armature shaft, wherein each planetary gear is rotatable on a respective pin and the pins are linked to the rotatable drive shaft. A pinion assembly is provided in the housing. The pinion assembly includes a pinion shaft that is engageable at one end with the drive shaft and includes a pinion at the other end engageable with a flywheel of an engine. The pinion shaft further includes a groove formed around an external surface of the pinion shaft. A solenoid assembly is provided in the housing for selectively energizing the electrical motor, wherein the solenoid assembly is coaxial with the drive shaft. The solenoid assembly includes a plunger having a bore. The plunger is engageable with the pinion assembly to move the pinion into engagement with the flywheel. A return spring is provided that is positioned around the pinion shaft without contacting the pinion shaft. The return spring is positioned at least in part within the bore of the plunger of the solenoid assembly. A contact member is provided that is positioned within the groove formed around the external surface of the pinion shaft. The contact member is also positioned within the bore of the plunger of the solenoid assembly. A plunger stop assembly is provided around the pinion assembly. The plunger stop assembly includes a groove formed in a surface opposite the surface facing the flywheel. One end of the return spring pushes against the groove of the plunger stop assembly. Energization of the solenoid assembly moves the plunger which in turn moves the contact member which in turn moves the pinion assembly to thereby engage the pinion with the flywheel. Upon deenergization of the solenoid assembly, the return spring moves the contact member which in turn moves the pinion assembly to move the pinion from engagement with the flywheel.

The advantages of the invention will be set forth in the description below, and in part will be apparent from the description, or may be learned by practice of the invention. The advantages of the invention may be realized and obtained by the combinations set forth in the attached claims.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE PREFERRED EMBODIMENTS

Figure 1:
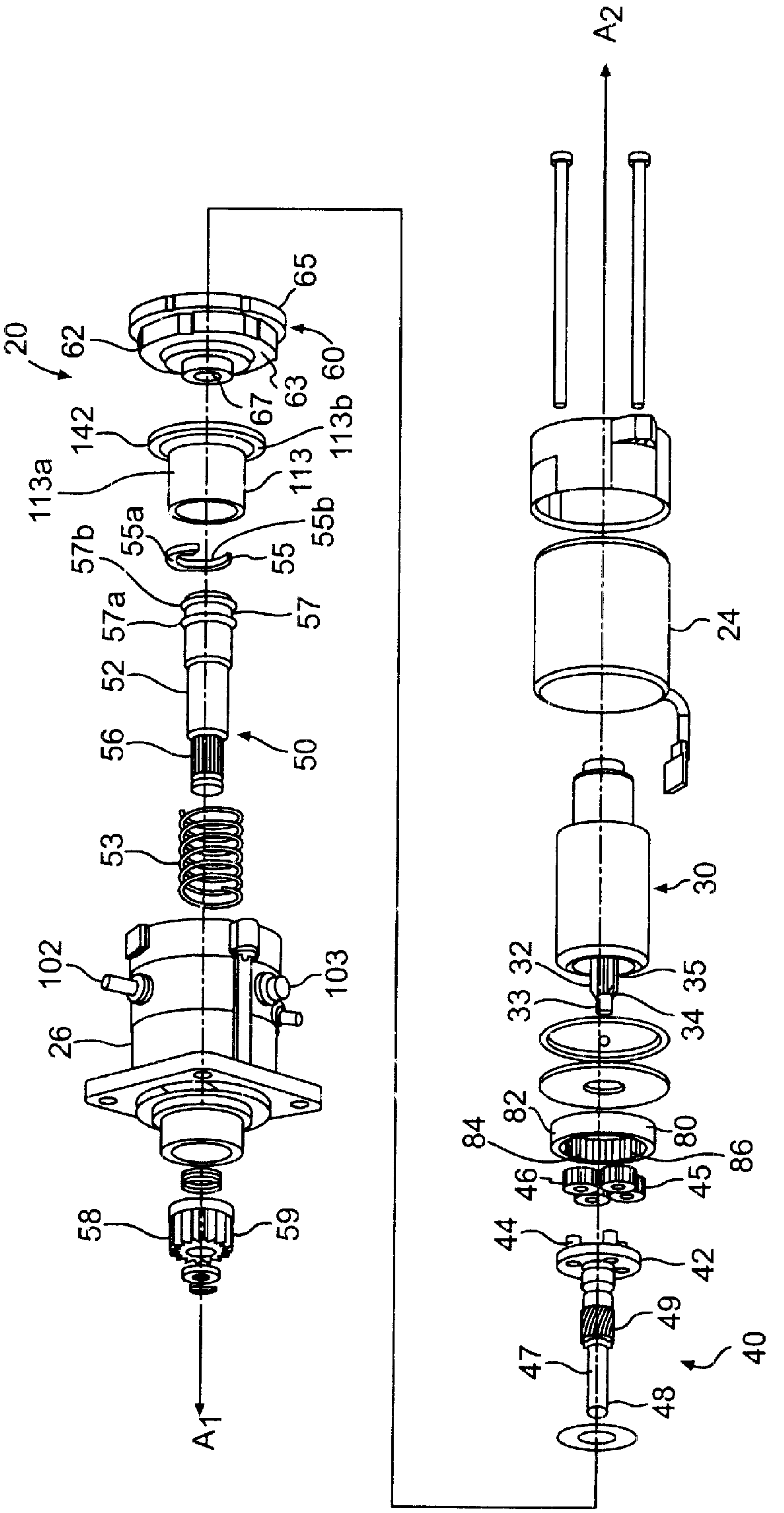
FIG. 1 is an exploded perspective part view of one embodiment of a starter motor assembly according to the present invention.

Reference will now be made in detail to the present preferred embodiments of the invention, examples of which are illustrated in the accompanying drawings. Wherever possible, the same reference numbers will be used throughout the drawings to refer to the same or like parts.

DESCRIPTION OF THE COMPONENTS OF THE PRESENT INVENTION

In accordance with the invention, a starter motor assembly is provided, designated generally by reference numeral 20. As broadly embodied in FIGS. 1, 2, and 5–12, the starter motor assembly 20 includes a housing 22, preferably divided between a motor housing 24 and a pinion housing 26. Motor housing 24 and pinion housing 26 preferably are generally cylindrical and relatively compact in order to reduce the space required to accommodate the starter motor assembly.

Figure 2:
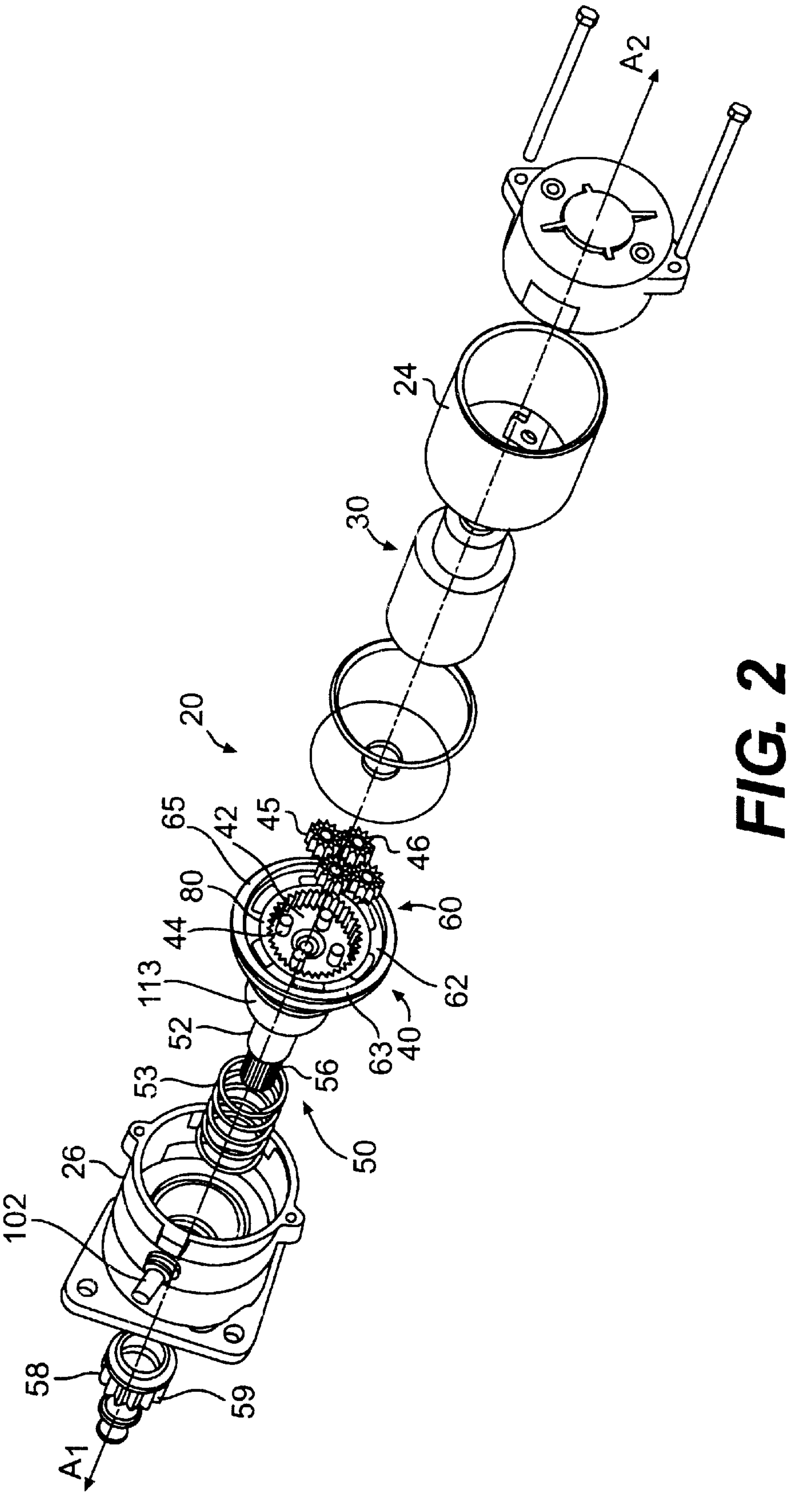
FIG. 2 is a partially exploded perspective part view of the starter motor assembly depicted in FIG. 1.

An electrical motor is provided in the housing and has a rotatable armature shaft. As depicted in FIGS. 1, 2, and 5–12, an electrical motor 30, preferably a direct current motor, is provided in motor housing 24, with a rotating armature shaft 32 having a distal end 33 projecting out of motor housing 24. Armature shaft 32 defines an axis $A_1$–$A_2$ for the entire assembly 20 as shown in FIGS. 1 and 2. As also shown in FIG. 1, armature shaft 32 preferably includes a plurality of gear teeth 35 defining a sun gear 34 provided around a circumference thereof proximate the distal end 33 of shaft 32. It will be understood by persons skilled in the art that armature shaft 32 will rotate upon application of electrical current to the electrical motor 30. It will be further understood that armature shaft 32 can rotate in either a clockwise or counterclockwise direction, depending on the specific construction of the motor.

In one embodiment, a planetary gear assembly is provided in the housing. The planetary assembly includes a rotatable drive shaft and a plurality of planetary gears engaged with the armature shaft, each planetary gear rotatable on a respective pin, the pins being linked to the rotatable drive shaft. As shown in FIGS. 1 and 2, a planetary gear assembly 40 is provided within pinion housing 26. As shown in FIGS. 1, 2, and 13, a rotatable circular plate defines a planet carrier 42 and includes a plurality of pins 44 projecting from one side thereof. Each pin 44 (four are shown in the FIGS., but this number is not required) supports and provides an axis of rotation for a rotatable planetary gear 45. Each planetary gear 45 includes a set of gear teeth 46 on an outer circumference thereof. As shown in FIG. 13, pins 44 and planetary gears 45 are disposed in a pattern so as to define an inner circle I.C. and an outer circle O.C. coaxially disposed around axis $A_1$–$A_2$. Armature shaft 32 projects into the center of the inner circle I.C., and gear teeth 35 of sun gear 34 on armature shaft 32 engage planetary gear teeth 46 in the inner circle I.C. As shown in FIGS. 1 and 5–12, the planetary gear assembly 40 further includes a drive shaft 47 that projects from the side of rotatable circular plate or planet carrier 42 opposite to planetary gears 45 and that is rotatable with the circular plate 42. Drive shaft 47 includes a distal end 48, with a plurality of external splines 49 provided around a circumference of drive shaft 47 proximate its distal end 48. Drive shaft 47 is coaxial with axis $A_1$–$A_2$.

A pinion assembly is provided in the housing that is engageable at one end thereof with the drive shaft of the planetary gear assembly and includes a pinion at the other end that is engageable with the flywheel of an engine. As shown in FIGS. 1–12, a pinion assembly 50 preferably includes a pinion shaft 52, having a bore with internal splines 54 (see FIG. 4) at one end for engagement with external splines 49 on drive shaft 47. Distal to that same end, pinion shaft 52 includes a groove 57. As shown most clearly in FIG. 3, groove 57 is defined by two annular outward extending protrusions **57*a*, 57*b*. At the other end, as shown in FIGS. 1 and 2, pinion shaft 52 preferably has external splines 56, which engage with a pinion 58. Pinion 58 projects out of pinion housing 26 and preferably has external gear teeth 59 for engagement with a ring gear 10** of the flywheel of an engine (not shown) when the starter motor assembly is energized.

In the present invention, as shown in FIGS. 1, 2, and 4–12, a pinion spring 53 surrounds pinion shaft 52, without directly contacting pinion shaft 52. As discussed in more detail below, pinion spring 53 operates to move pinion shaft 52 (and thus pinion 58) away from the flywheel without directly contacting pinion shaft 52 and/or rotating with pinion shaft 52. Although the preferred embodiment shown and described includes pinion shaft 52, the invention is not limited to including this structure. It is conceivable, for example, that pinion 58 can be engaged directly with drive shaft 47, assuming that pins 44 and/or drive shaft 47 of the planetary gear assembly are made long enough.

In one embodiment, a clutch assembly, such as an overrunning clutch assembly described in the Bori et al. patent, which is incorporated herein by reference, is provided coaxially around the planetary gears to allow the planetary gear shaft to rotate at higher speeds and/or in the opposite direction (from the cranking of the engine) and to ensure that these higher rotational speeds or opposite directional velocities are not transmitted to the engine motor armature shaft. The clutch assembly may include a non-rotatable annular outer clutch piece removably fixed to an inner circumference of the housing, a rotatable annular inner clutch piece having an outer circumference provided proximate an inner circumference of the outer clutch piece and an inner circumference engaged with the planetary gears, and rotation control means provided between the outer clutch piece and the inner clutch piece for preventing rotation of the inner clutch piece in a first direction and allowing rotation of the inner clutch piece in a second direction.

As shown in FIGS. 1, 2, and 13, clutch assembly 60 includes an annular outer clutch piece 62, preferably a drive ring, and an annular inner clutch piece 80, preferably a ring gear. Both outer clutch piece 62 and inner clutch piece 80 are coaxial with axis $A_1$–$A_2$. Outer clutch piece 62 is part of an integrated clutch shell 63, which also includes an outer annular portion 65. As shown in FIG. 13, integrated clutch shell 63 is fixed to the pinion housing 26 around an outer circumference of outer annular portion 65 of integrated clutch shell 63. As shown in FIG. 1, integrated clutch shell 63 defines an opening 67 through which planetary gear drive shaft 47 is inserted when assembling the present invention. Unlike the invention disclosed in the Bori et al. patent, because integrated clutch shell 63 integrally includes outer clutch piece 62 and because integrated clutch shell 63 is fixed to pinion housing 26, inner clutch piece 80 may only rotate with respect to outer clutch piece 62 in one direction.

Because integrated clutch shell 63 integrally includes outer clutch piece 62, the starter motor assembly is simplified by having one part instead of two parts. In addition, the integrated clutch shell is advantageous because it has improved strength, permits a smaller diameter piece and, thus, a smaller diameter pinion housing, and improves the concentricity of the electrical motor to the clutch assembly.

As shown in FIGS. 1 and 13, inner clutch piece 80 includes a generally smooth outer circumference 82 and an inner circumference 84 that is configured with a plurality of axially extending gear teeth 86. Smooth outer circumference 82 is configured to rotate with respect to an inner circumference 66 of outer clutch piece 62. Inner gear teeth 86 are configured to engage with gear teeth 46 of each planetary gear 45 around the outer circle O.C. defined by the planetary gears 45, as shown in FIG. 13.

As stated above, the clutch assembly includes rotation control means to prevent the rotation of the inner clutch piece in a first direction and to allow the rotation of the inner clutch piece in a second direction. The rotation control means will not be discussed here in detail; instead, one type of rotation control means is described in detail in the Bori et al. patent.

Figure 14:
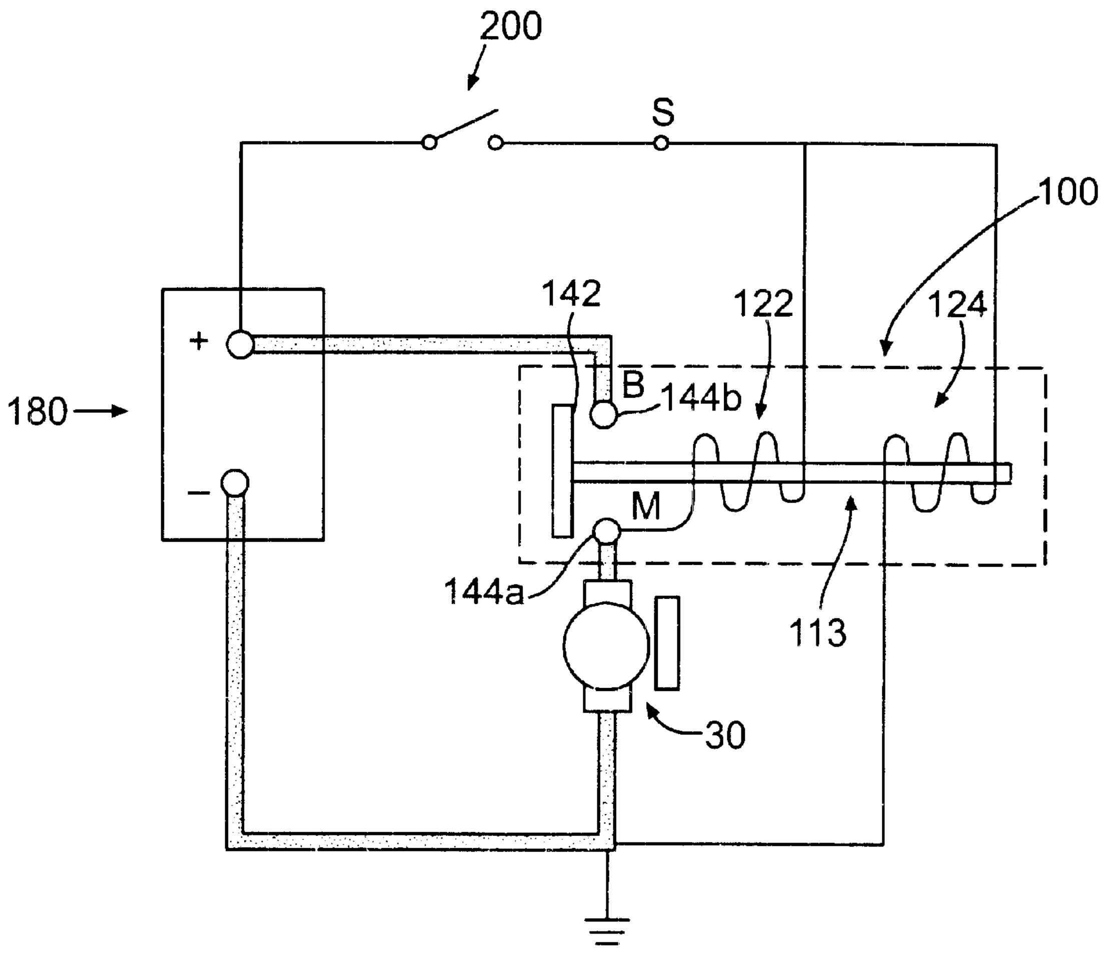
FIG. 14 is an electrical circuit diagram of one embodiment of a starter motor assembly according to the present invention.

A solenoid assembly is provided for selectively energizing the electrical motor. As shown in FIGS. 5–12 and 14, a solenoid assembly 100 includes a battery "B" contact 102 and a solenoid "S" contact 103 (see FIGS. 1 and 2) fixed to pinion housing 26. As shown in FIG. 14, upon the closing of the ignition switch 200, an electrical connection is made between battery 180 and the windings (not shown) of electrical motor 30 to energize the electrical motor 30. In the embodiment illustrated, energization of solenoid assembly 100 upon closing of the ignition switch causes the solenoid assembly 100 to operate to move pinion shaft 52 and, thus, pinion 58 in the axial direction $A_1$–$A_2$, such that pinion 58 engages ring gear 10 of the flywheel of the engine to be started, as discussed below.

Energization of the solenoid assembly 100 utilizes coils comprised of a pull-in coil 122 and a hold-in coil 124, as shown in FIGS. 5–12 and 14. In one embodiment, pull-in coil 122 of solenoid assembly 100 is comprised of multiple coils that are arranged in parallel. Reference is made to U.S. patent application Ser. No. 09/804,183, filed Mar. 13, 2001, entitled "Multiple Coil Pull-in Coil for a Solenoid Assembly for a Starter Motor Assembly" and assigned to Delco Remy America, Inc., which is incorporated herein by reference.

A plunger 113 is shifted axially when pull-in coil 122 and hold-in coil 124 are energized (to the left as shown in FIGS. 6–10). Plunger 113 operates a moveable electrical contact 142 (also known as a plunger contact). Moveable contact 142 may be moved to contact a pair of fixed electrical contacts **144*a*, 144*b* to electrically connect contact 142 with contacts 144*a*, 144*b*. In particular, when coils 122, 124 are energized, plunger 113 is shifted in a direction to cause moveable contact 142 to engage fixed contacts 144*a*, 144*b*. This movement of plunger 113 also causes pinion shaft 52 and, thus, pinion 58 to be shifted in that direction, thereby engaging pinion 58 with the engine flywheel. As shown in FIG. 14, when pinion 58 is engaged with the engine flywheel and moveable contact 142 is electrically connected with fixed contacts 144***a*, 144*b*, pull-in coil 122 is bypassed or short circuited and full electrical current is applied to starter motor 30.

Once coils 122, 124 bias plunger 113 in the axial direction for pinion-flywheel engagement, and after pull-in coil 122 is short circuited, hold-in coil 124 maintains plunger 113 in that position to maintain pinion 58 in engagement with the engine flywheel and also to maintain contact 142 in an electrical connection with contacts 144*a*, 144*b*. Hold-in coil 124 generally provides sufficient force to keep plunger 113 in such a position, against the force of return spring 53 biasing in the axial direction away from pinion-flywheel engagement.

Figure 11:
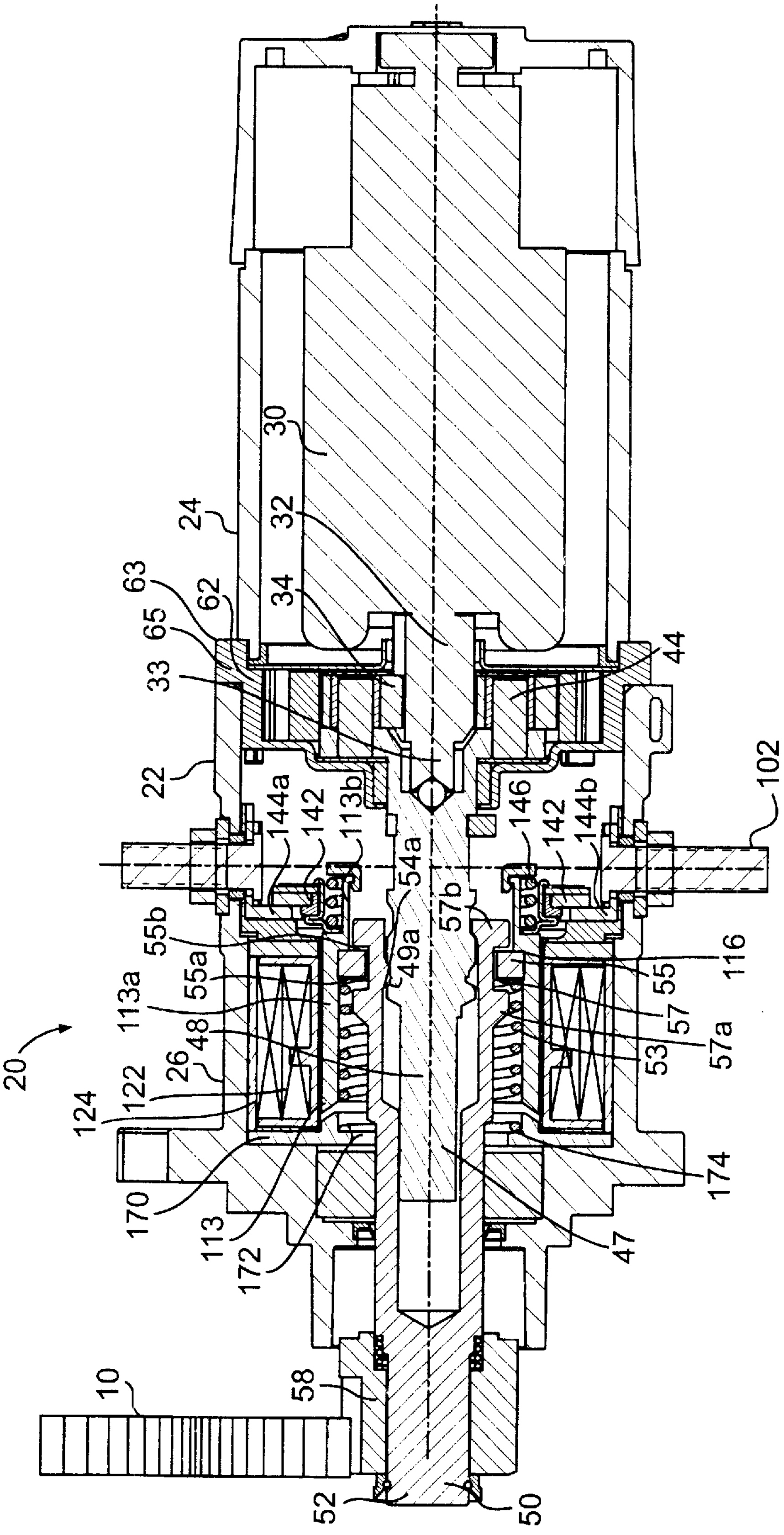
FIG. 11 is a side cross-sectional view of the starter motor assembly depicted in FIG. 1, at a time just after the solenoid is deenergized and the plunger is beginning to move in the axial direction away from pinion-flywheel engagement.
Figure 12:
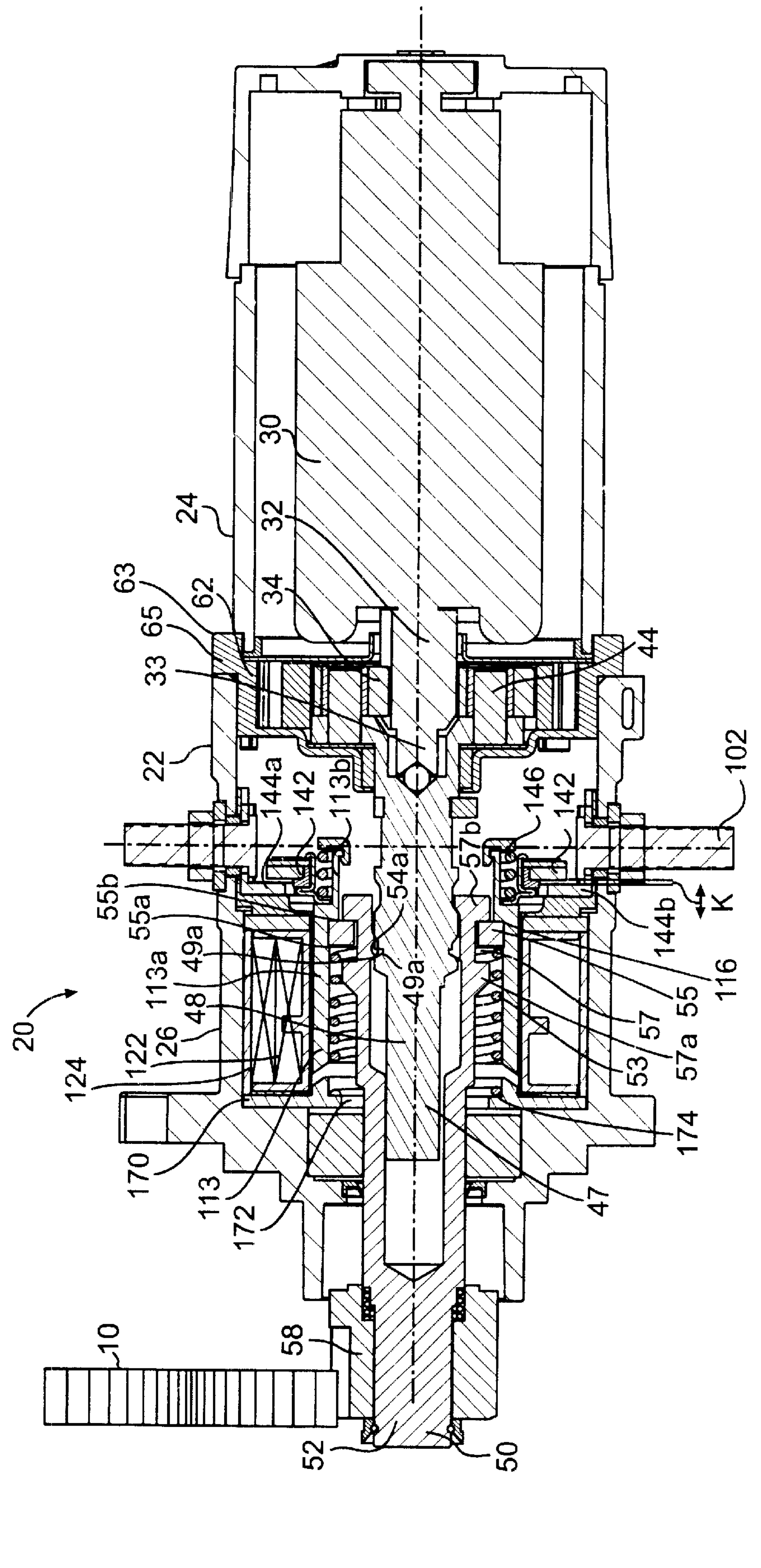
FIG. 12 is a side cross-sectional view of the starter motor assembly depicted in FIG. 1, at a time when the contact member picks up the pinion shaft to move it in an axial direction away from pinion-flywheel engagement.
Figure 13:
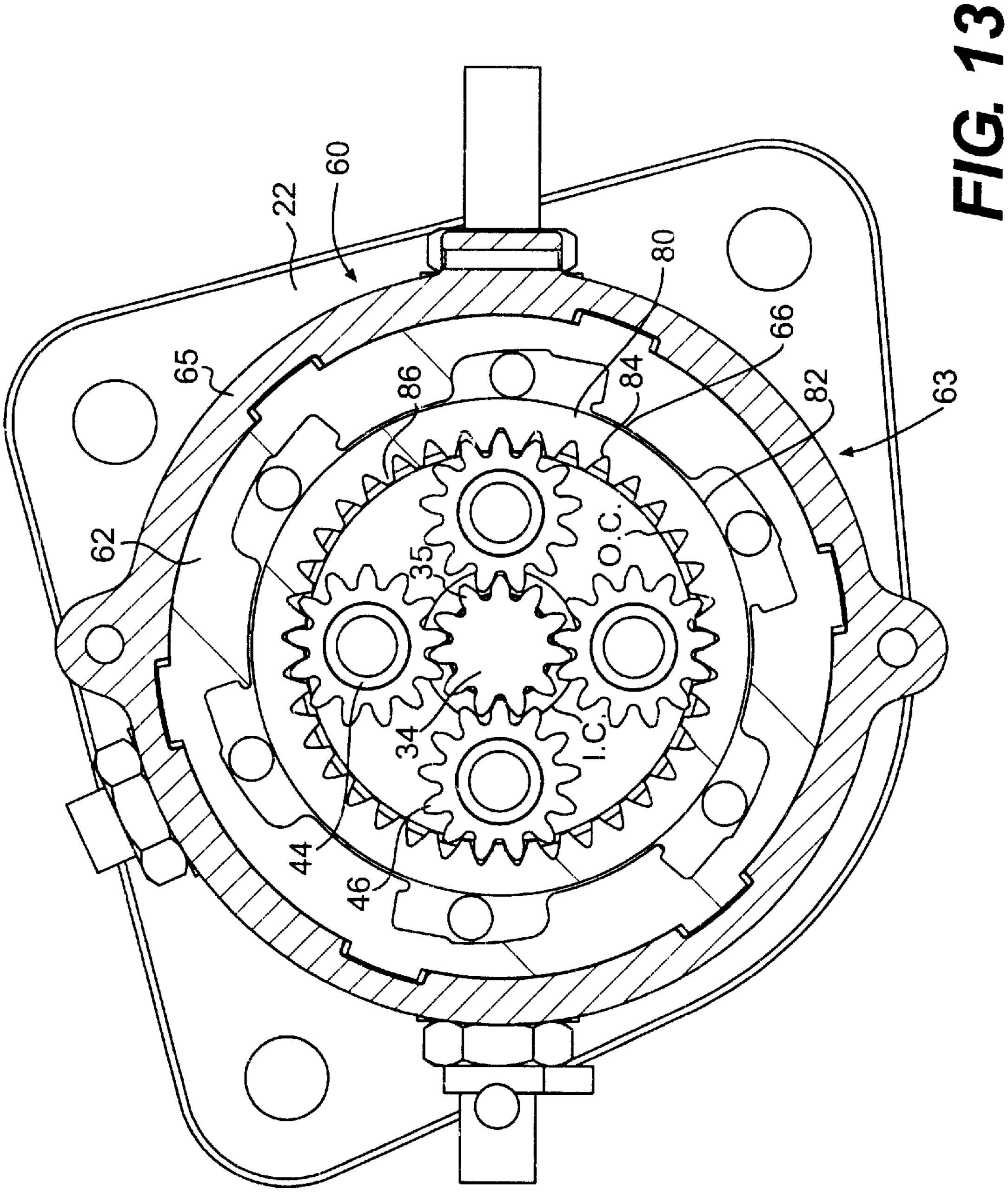
FIG. 13 is a top view of one embodiment of a clutch assembly provided within the starter motor assembly of the present invention.

When termination of engine cranking is desired, the ignition switch 200 (see FIG. 14) is opened, thereby deenergizing hold-in coil 124, which results in return spring 53 moving plunger 113 and pinion 58 in the axial direction away from pinion-flywheel engagement (to the right as shown in FIGS. 11 and 12). Thus, return spring 53 causes moveable contact 142 to separate from fixed contacts 144*a*, 144*b* and causes pinion 58 to be pulled out of engagement with ring gear 10 of the engine flywheel. As discussed below, return spring 53 moves pinion shaft 52 and pinion 58 without directly contacting and/or rotating with pinion shaft 52 and/or pinion 58.

Plunger 113 of the solenoid assembly 100 is generally made of a material that may be magnetized upon energization of the solenoid coils. When produced, this magnetic field causes plunger 113 to be biased in the axial direction. Typically, plunger 113 is made of a low carbon steel. While solenoid plunger 113 is typically comprised of a low carbon steel, such a material generally does not comprise a high wear surface.

Figure 3:
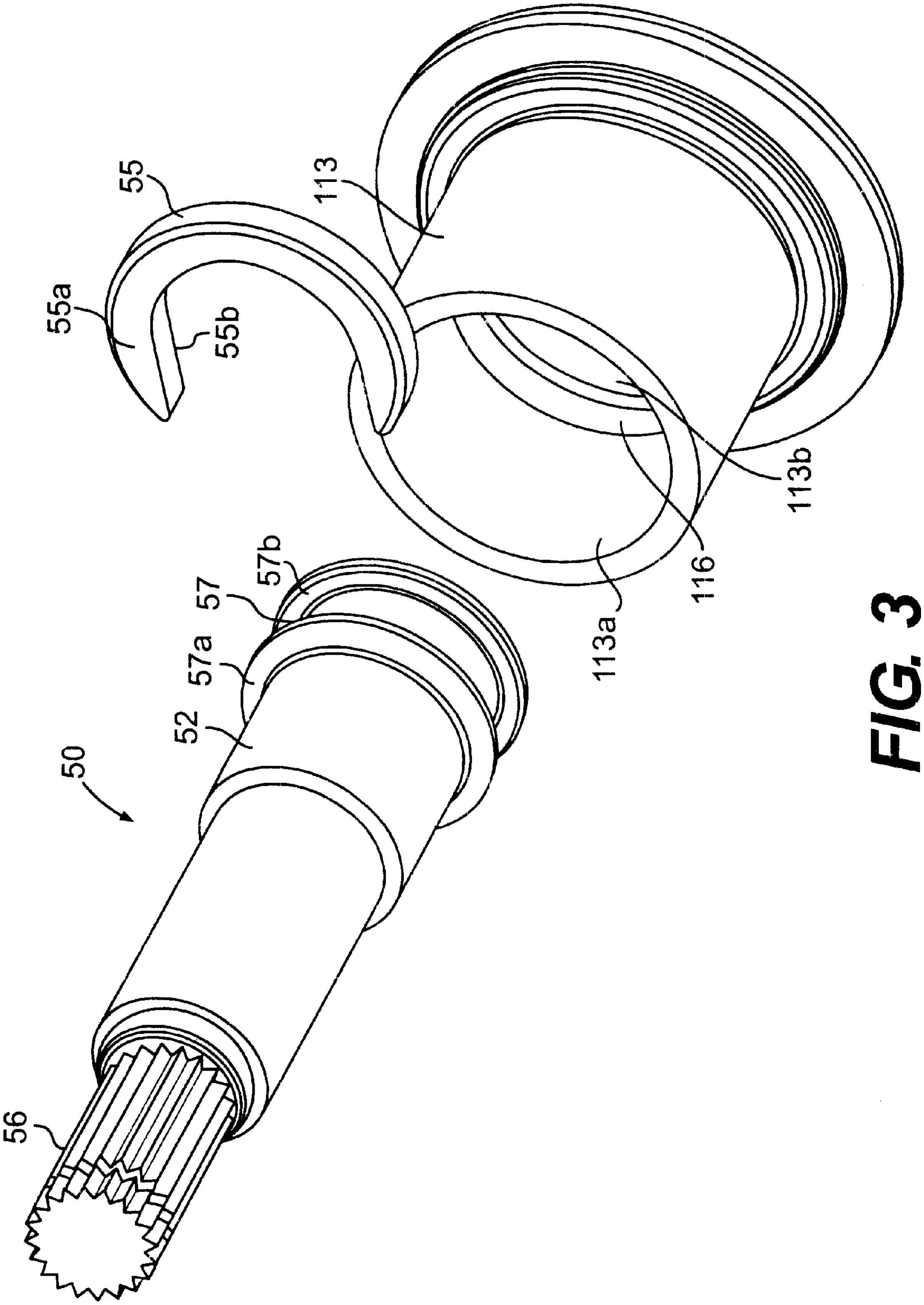
FIG. 3 is an exploded perspective part view of one embodiment of the unassembled pinion assembly, contact member, and solenoid plunger of the embodiment depicted in FIG. 1.
Figure 4:
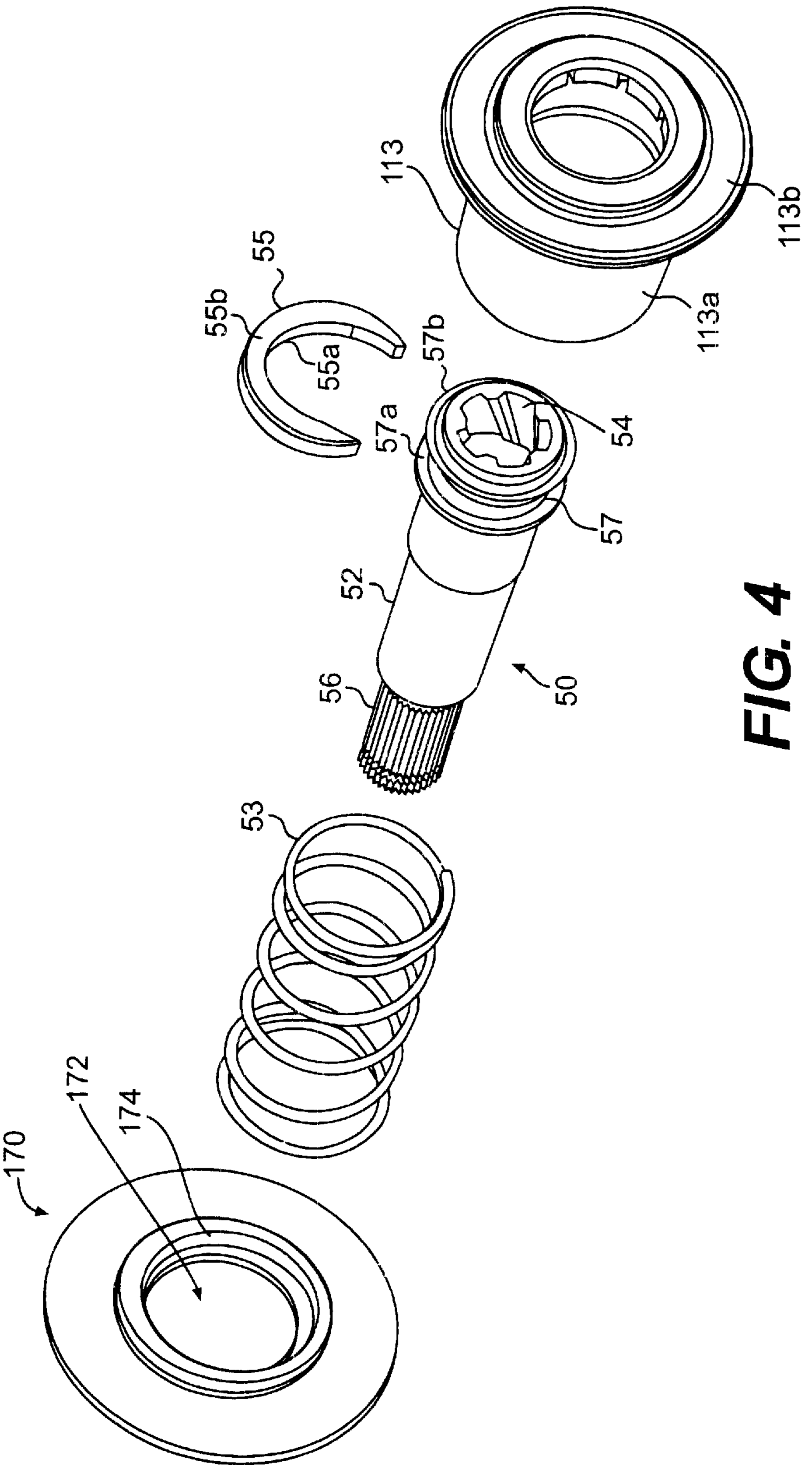
FIG. 4 is an exploded perspective part view of one embodiment of the unassembled plunger stop assembly, return spring, pinion assembly, contact member, and solenoid plunger of the embodiment depicted in FIG. 1.

As shown in FIGS. 5–12, while pinion spring 53 of the present invention is positioned within solenoid plunger 113, it does not contact nor push directly against plunger 113, pinion 58, or pinion shaft 52. A harder surface contact member 55 is placed within plunger 113 to contact spring 53. In one embodiment, contact member 55 is penannular in shape, such as a C-ring, as illustrated in FIGS. 1, 3, and 4. In another embodiment, contact member 55 is annular in shape, such as a washer. Contact member 55 may comprise any type of harder surface, including non-magnetic metals such as case hardened steel, stainless steel, or brass.

As shown in FIGS. 3–12, in one embodiment, plunger 113 is a shaft with a bore defined in it. Plunger 113 generally has at least two different cross-sectional areas 113*a* and 113*b*. This difference in the two cross-sectional areas 113*a*, 113*b* results in an internal contact surface 116 (see FIG. 3) within the bore of plunger 113, which is formed at the juncture of the two cross-sectional areas 113*a* and 113*b*.

Contact surface 116 is not limited, however, to comprising a stepped surface between the juncture between two different cross-sectional areas 113*a* and 113*b* of plunger 113. Generally, contact surface 116 may comprise any surface connected with the inner circumferential surface of plunger 113 that allows contact member 55 to rest against and contact such contact surface 116. For example, in another embodiment (not shown), the plunger may have a single cross-sectional area and include a flange that projects inward from an inner wall of the single cross-sectional area. The flange comprises a contact surface for the contact member to rest against and contact. In the alternative, the plunger may include a plurality of flanges projecting inward from the inner wall to comprise the contact surface. In another alternative, the plunger may include a pin or a plurality of pins that project inward from the inner wall of the single cross-sectional area to comprise a contact surface.

Again, the contact member 55 rests against and contacts this contact surface 116 of plunger 113. In addition, upon assembly, contact member 55 is positioned within groove 57 of pinion shaft 52 (see FIG. 3).

A plunger stop assembly is positioned near the end of the pinion shaft around the pinion shaft, as shown in FIGS. 4–12. Plunger stop assembly includes a plunger stop 170 that defines a hole 172 therein through which pinion shaft 52 is positioned. Plunger stop 170 also includes a groove 174 formed in the surface of plunger stop 170 opposite from the surface facing the engine flywheel. One end of pinion spring 53 is generally positioned within this groove 174. Accordingly, this end of pinion spring 53 continually pushes against plunger stop 170 at groove 174. Plunger stop 170 presses against pinion housing 26 due to return spring 53.

Accordingly, referring to FIGS. 1–4, the starter motor assembly is assembled in the following manner. Preferably, inner ring piece 80 is inserted into integrated clutch shell 63. Then, distal end 48 of drive shaft 47 of planetary gear assembly 40 is inserted through opening 67 defined by integrated clutch shell 63. Distal end 48 of drive shaft 47 of planetary gear assembly 40 is then inserted into the bore formed by pinion shaft 52, such that external splines 49 on drive shaft 47 engage with internal splines 54 of pinion shaft 52. Splines 49, 54 engage and lock up so that drive shaft 47 and pinion shaft 52 rotate together. As shown in FIG. 3, contact member 55 is positioned within groove 57 around the external surface of pinion shaft 52. Plunger 113 is positioned around pinion shaft 52 and around contact member 55 so that contact member 55 may contact internal contact surface 116 (see FIG. 3) of plunger 113. Return spring 53 is positioned so that is surrounds pinion shaft 52 but does not directly contact pinion shaft 52.

In addition, a first end of return spring 53 is positioned against contact member 55 within plunger 113. As shown in FIGS. 5–12, return spring 53 is positioned at least in part within plunger 113. Plunger stop 170 is then positioned around pinion shaft 52. The first end of return spring 53 pushes against contact member 55 within plunger 113, while the opposite second end of return spring 53 pushes against plunger stop 170 at groove 174 which, in turn, is pushed against pinion housing 26. In this manner, return spring 53 is prevented from contacting pinion shaft 52 because return spring 53 has a larger diameter than the outer circumference of pinion shaft 52 and because both ends of return spring 53 are maintained in a position so as to maintain the concentricity of spring 53 around pinion shaft 52. In other words, because one end of spring 53 is maintained with groove 174 of plunger stop 170 and the other end of spring 53 is maintained against member 55 within plunger 113, the body of spring 53 between its ends will not move in a radial direction toward pinion shaft 52 to contact pinion shaft 52. Return spring 53 is also kept separate from pinion 58 by plunger stop 170 and pinion housing 26.

OPERATION OF THE INVENTION

Operation of the invention will now be described, referring to FIGS. 5–12. FIGS. 5–12 illustrate the sequence of the starter motor assembly being started to crank an engine and then being turned off once the engine is cranked, as well as the sequence of motion as the mechanism engages and then disengages pinion 58 from ring gear 10 of the engine flywheel.

Figure 5:
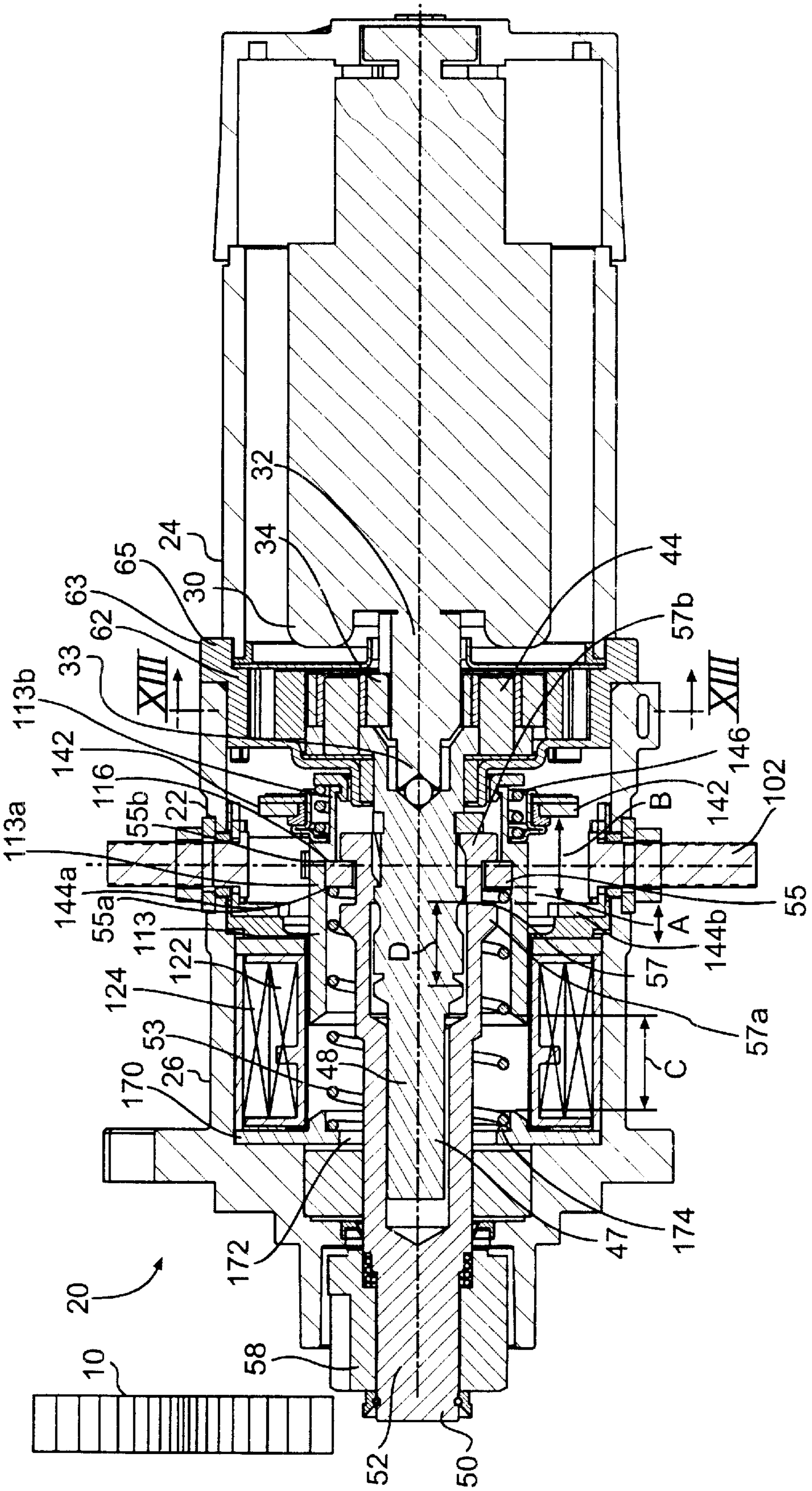
FIG. 5 is a side cross-sectional view of the starter motor assembly depicted in FIG. 1 at rest, i.e., at a time just before the solenoid is energized.

FIG. 5 illustrates starter motor assembly 20 just before the ignition switch is closed and, thus, just before the solenoid assembly is energized. As shown, contact member 55 is contacting contact surface 116 of plunger 113.

Figure 6:
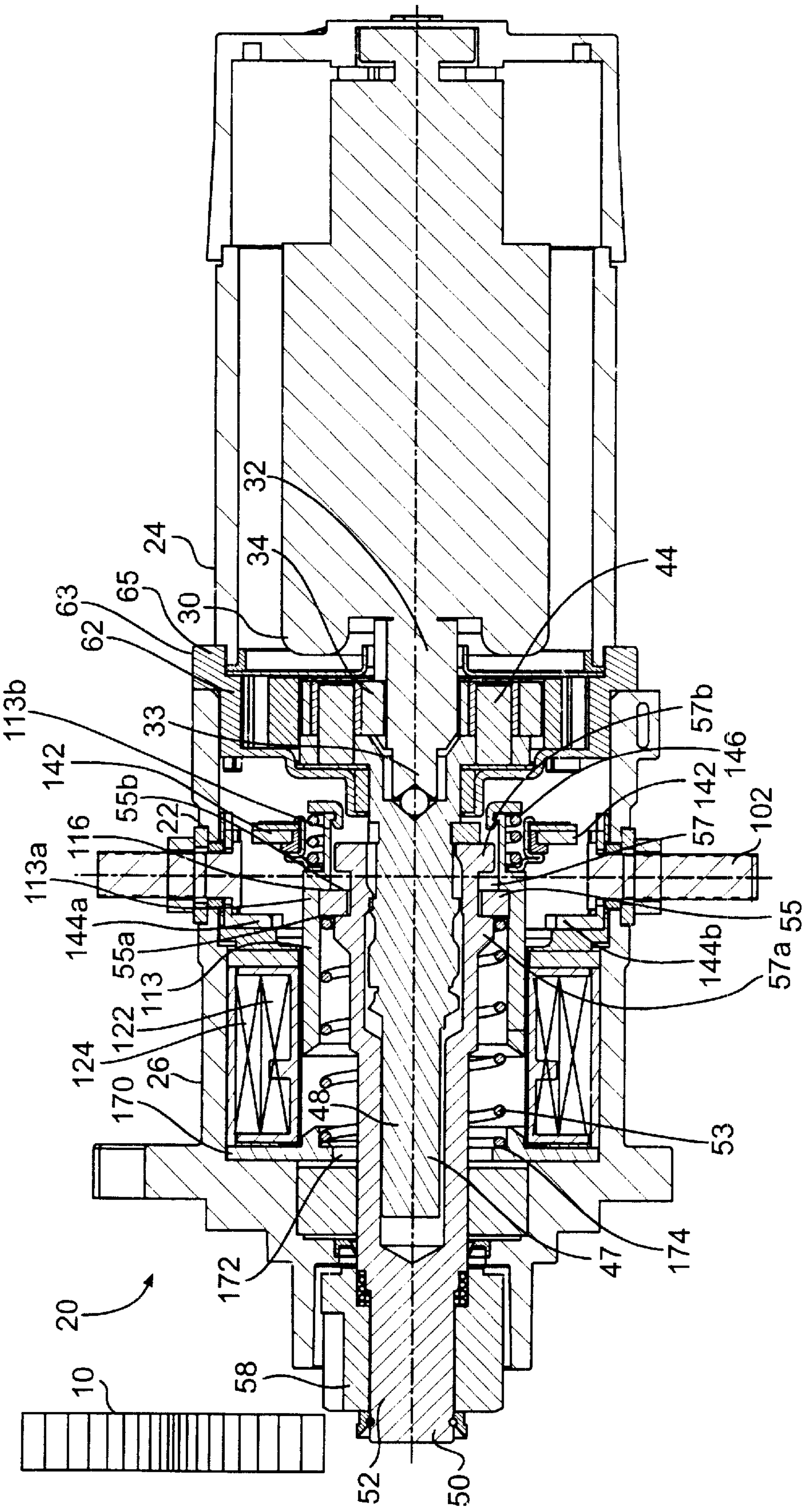
FIG. 6 is a side cross-sectional view of the starter motor assembly depicted in FIG. 1, at a time just after the solenoid is energized, when the contact member picks up the pinion shaft to move it in an axial direction toward pinion-flywheel engagement.

FIG. 6 illustrates the starter motor assembly 20 just after the ignition switch is closed. In particular, as shown in FIG. 14, when the ignition switch 200 is turned to the "on" position, battery terminal 102 (see FIGS. 5–12) transmits a low electric current from a starter battery 180 to energize solenoid assembly 100 and, in particular, to energize the solenoid coils (pull-in coil 122 and hold-in coil 124). The energization of the coils in turn magnetizes plunger 113, causing plunger 113 to be moved in the axial direction.

As shown in FIG. 6, the movement of plunger 113 in turn moves contact member 55 in that same axial direction because contact member 55 is contacting contact surface 116 of plunger 113. In addition, as stated above, contact member 55 rides within groove 57 around the external surface of pinion shaft 52. Thus, as plunger 113 is moved in the axial direction, contact member 55 "picks up" pinion shaft 52 at protrusion 57*a* of groove 57, thereby causing pinion shaft 52 and pinion 58 to be moved in that same axial direction (to the left in FIG. 6). At the same time, plunger 113 also moves moveable contact 142 towards fixed contacts 144*a*, 144*b*.

Figure 7:
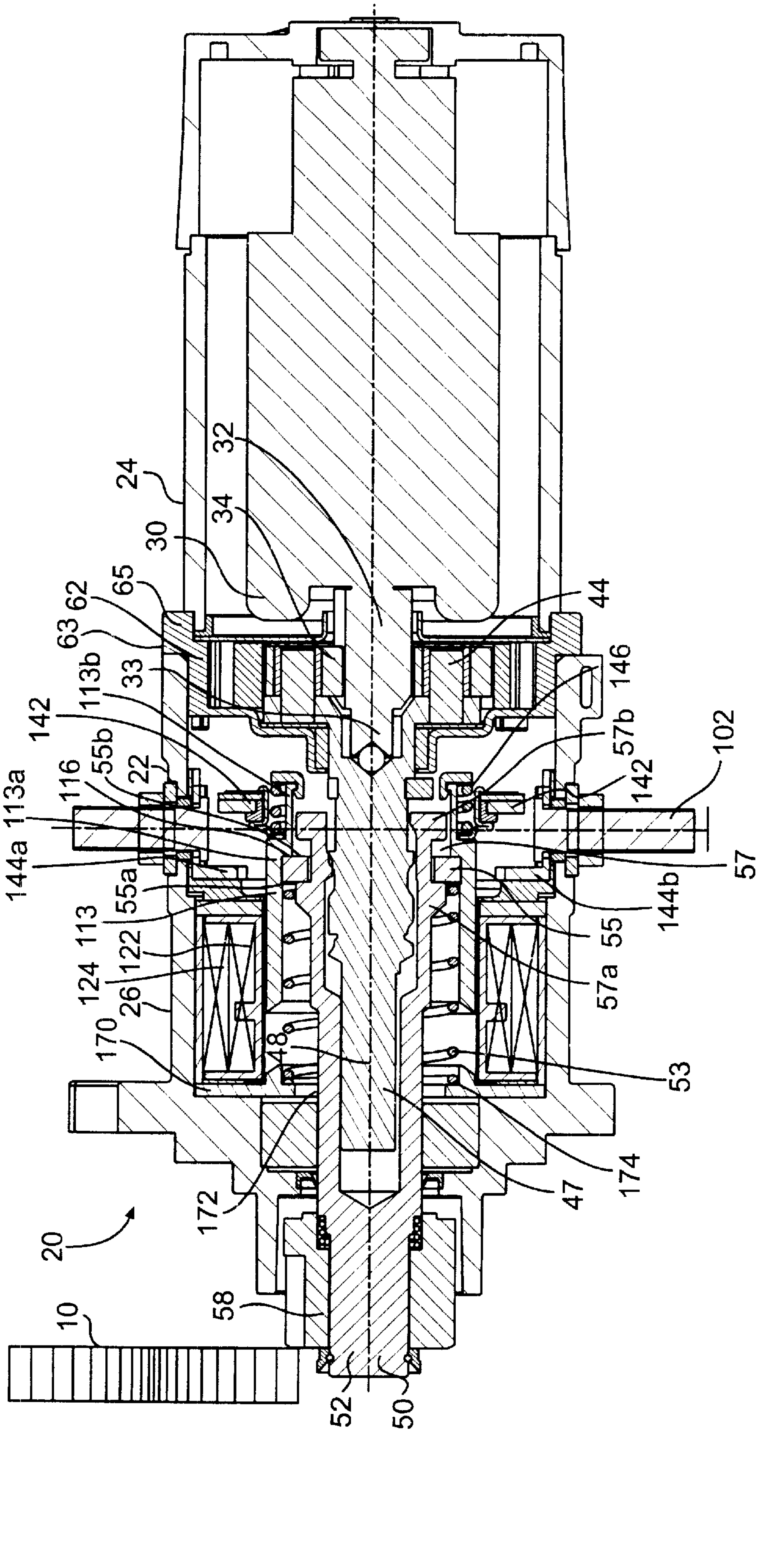
FIG. 7 is a side cross-sectional view of the starter motor assembly depicted in FIG. 1, at a time when the pinion abuts the ring gear of the engine.

Plunger 113 continues to move in that same axial direction, thereby also moving pinion shaft 52 and pinion 58 to move in that direction, so that pinion 58 abuts ring gear 10 of the engine flywheel, as shown in FIG. 7.

Figure 8:
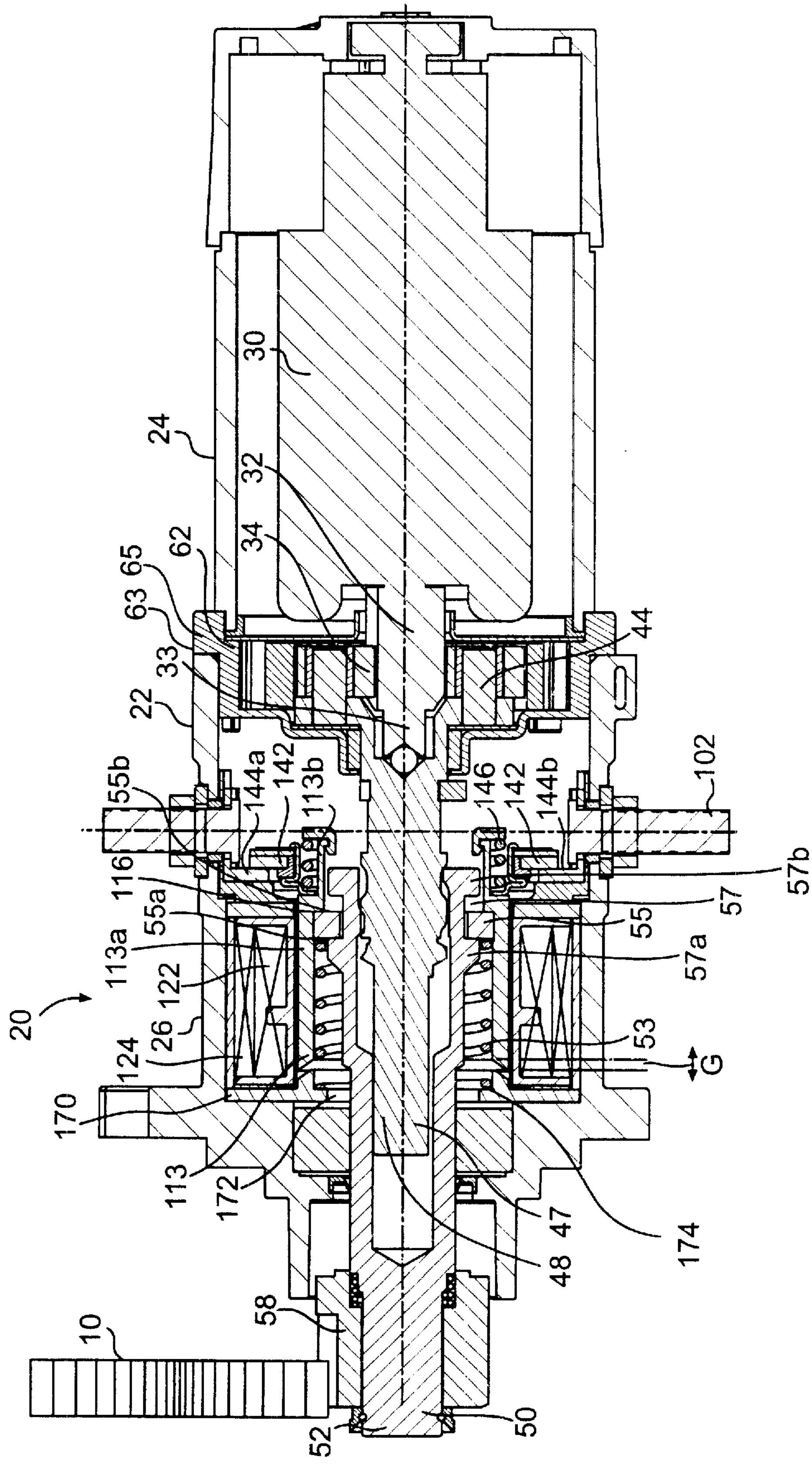
FIG. 8 is a side cross-sectional view of the starter motor assembly depicted in FIG. 1, at a time when the electrical contacts of the motor close.

Plunger 113 further continues to move in that same axial direction, again moving pinion shaft 52 and pinion 58 and moving moveable contact 142 until moveable contact 142 electrically connects with fixed contacts 144*a*, 144*b*, as shown in FIG. 8. As discussed above, as shown in FIG. 14, the electrical connection between moveable contact 142 and fixed contacts 144*a*, 144*b* causes pull-in coil 122 to be short-circuited. This electrical connection also causes an electrical current (full power) to be applied to electrical motor 30. The starting of electrical motor 30 in turn causes rotation of electrical motor armature shaft 32. In addition, as shown in FIG. 8, plunger 113 has moved a sufficient distance in that axial direction to allow pinion 58 to be moved into engagement with ring gear 10 of the engine flywheel.

Figure 9:
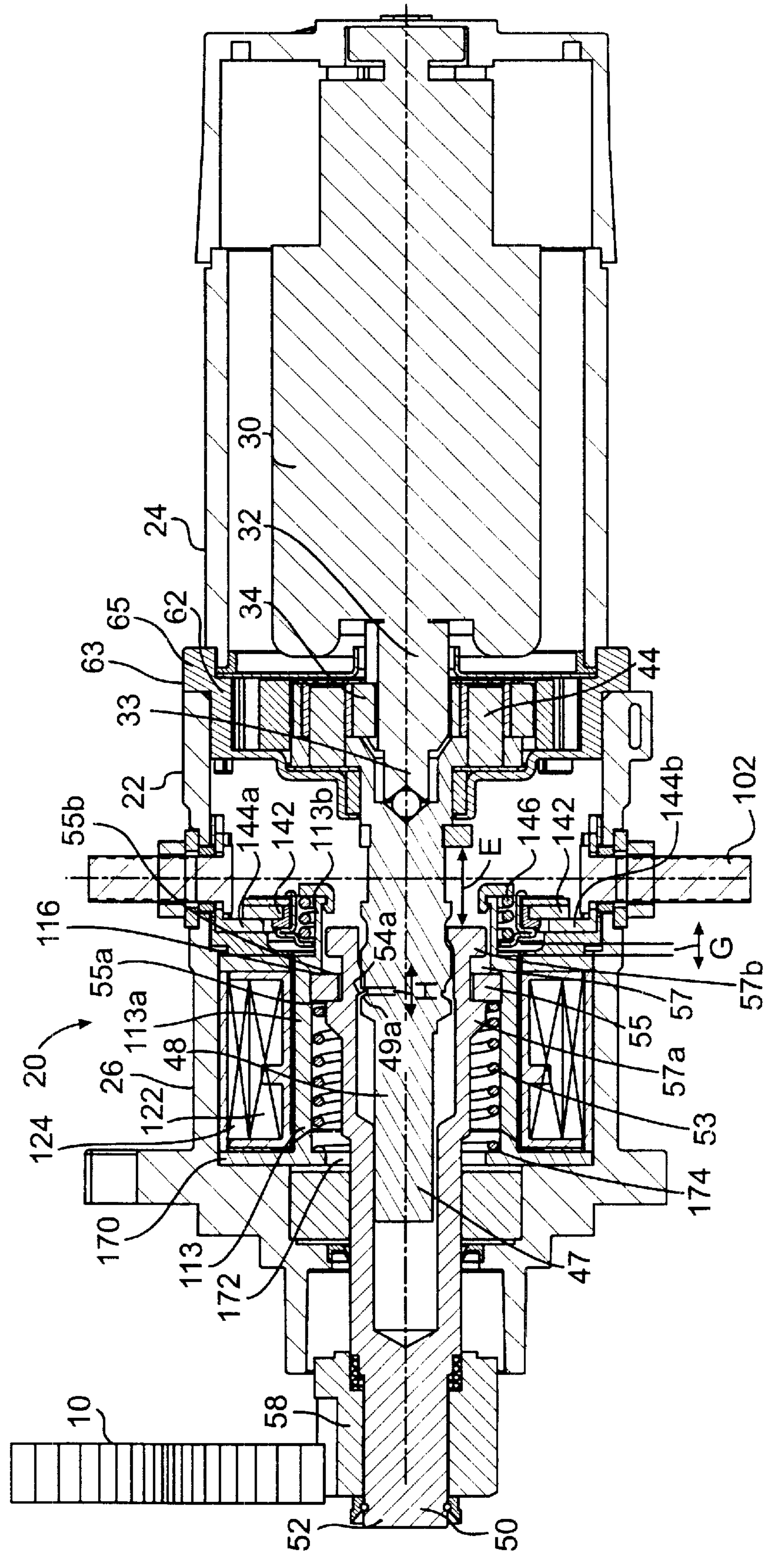
FIG. 9 is a side cross-sectional view of the starter motor assembly depicted in FIG. 1, at a time when the solenoid plunger is seated against the plunger stop, i.e., the plunger is moved to its farthest axial direction toward pinion-flywheel engagement.

Even after moveable contact 142 closes with fixed contacts 144*a*, 144*b*, plunger 113 continues to move in that same axial direction until plunger 113 seats against plunger stop 170, as shown in FIG. 9. Again, at this time, pinion 58 is in engagement with ring gear 10 of the engine flywheel.

Figure 10:
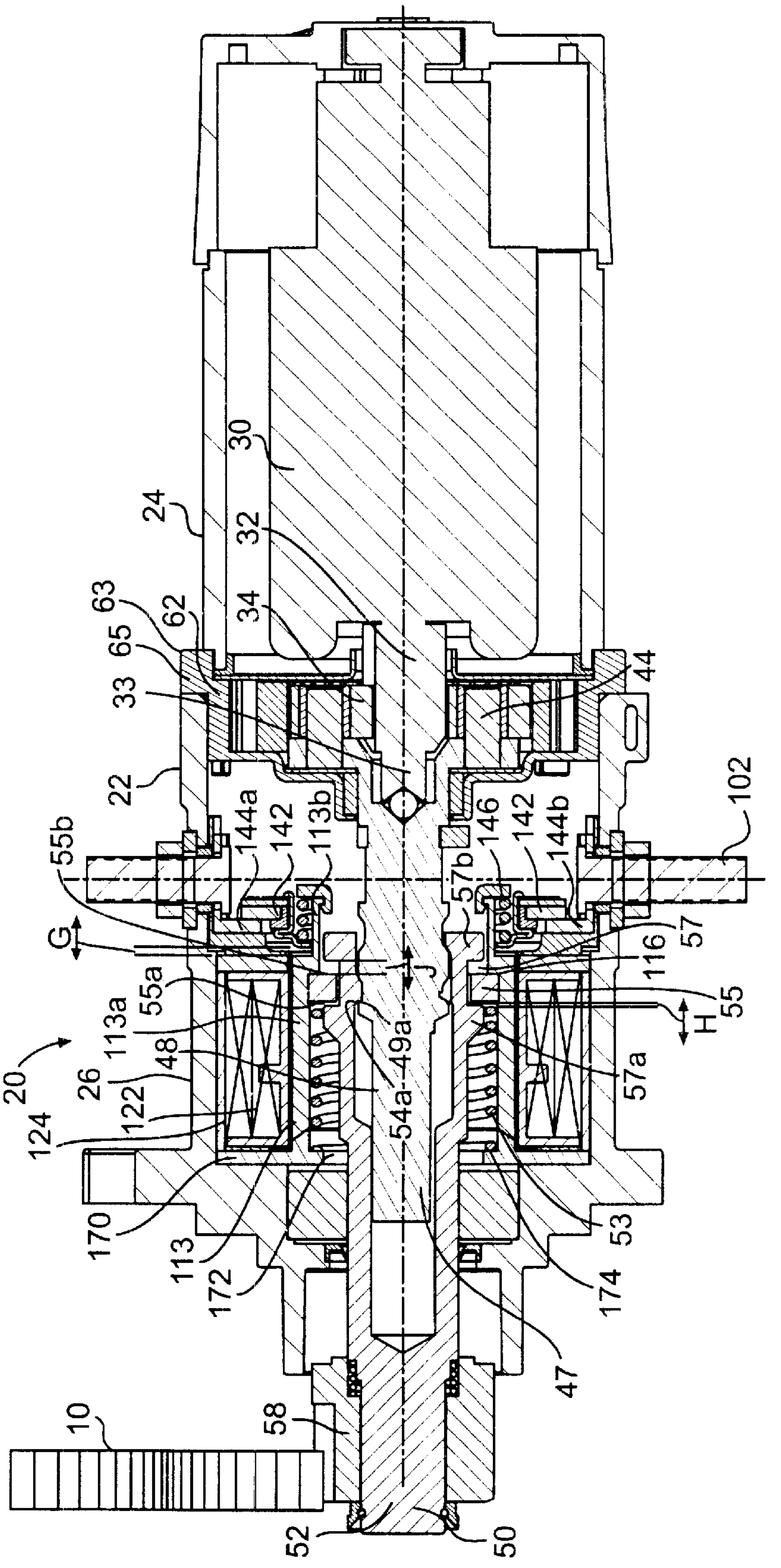
FIG. 10 is a side cross-sectional view of the starter motor assembly depicted in FIG. 1, at a time when the pinion shaft is moved to its farthest axial direction toward pinion-flywheel engagement relative to the planetary gear drive shaft.

Then, even after plunger 113 is seated against plungerstop 170, pinion shaft 52 continues to move in that same axial direction relative to planetary gear drive shaft 47, until a mating axial spline stop 54*a* of internal splines 54 of pinion shaft 52 hit an axial spline stop 49*a* of external splines 49 of planetary gear drive shaft 47, as shown in FIG. 10. At this time, the rotation of electrical motor armature shaft 32 is transmitted to planetary gear drive shaft 47, which in turn is transmitted to pinion shaft 52, thereby rotating pinion 58. Because pinion 58 is rotating and is in engagement with ring gear 10 of the engine flywheel, the engine is cranked.

Once the engine starts, the operator typically opens the ignition switch, which deenergizes the solenoid assembly 100 (see FIG. 14). Generally, at some point after deenergization of the solenoid assembly 100, the force of spring 53 overcomes the magnetic force of solenoid hold-in coil 124, as well as any axial thrust force pulling pinion 58 into engagement with ring gear 10, such that spring 53 moves plunger 113 through contact member 55. The contact member 55 in turn moves pinion shaft 52, thereby moving pinion 58 in the axial direction away from engagement with ring gear 10 of the engine flywheel (to the right as shown in FIGS. 11 and 12). Again, the moving of pinion shaft 52 and pinion 58 is accomplished without pinion spring 53 contacting pinion shaft 52 and/or pinion 58. Also, movement of plunger 113 causes moveable contact 142 and fixed contacts 144*a*, 144*b* to separate, thereby cutting off electrical current to motor 30.

FIG. 11 illustrates that point in time just after the solenoid assembly is turned off. At this time, spring 53 begins to move plunger 113 in the axial direction away from pinion-flywheel engagement. As stated above, this movement of plunger 113 in turn begins to move moveable contact 142 away from electrical connection with fixed contacts 144*a*, 144*b*, although contact 142 and contacts 144*a*, 144*b* are shown connected in FIG. 11. At this point, plunger 113 has moved away from its seated position, i.e., plunger 113 has moved in the axial direction away from contact with plunger stop 170, although plunger 113 has not yet begun to move pinion shaft 52 and pinion 58 away from pinion-flywheel engagement.

FIG. 11 also illustrates a situation when the engine fails to start. However, if the engine did start, the only difference would be that the overrunning torque (acting through helical splines 49, 54) would assist the disengagement of pinion 58. In this case, plunger 113 and pinion shaft 52 would move together in FIG. 11, rather than plunger 113 first and then pinion shaft 52.

As shown in FIG. 12, plunger 113 continues to move in the axial direction away from pinion-flywheel engagement so that moveable contact 142 is no longer electrically connected with fixed contacts 144*a*, 144*b*. At this point, electrical current is no longer applied to motor 30. As also shown in FIG. 12, spring 53 pushes against contact member 55, which in turn pushes against contact surface 116 of plunger 113. Here, because contact member 55 rides within groove 57 around the external surface of pinion shaft 52, contact member 55 picks up pinion shaft 52 at protrusion 57*b* (see FIG. 3) of groove 57, thereby beginning to move pinion shaft 52 and pinion 58 in the axial direction away from engagement with the engine flywheel (to the right as shown in FIG. 12).

In the foregoing manner then, while pinion spring 53 surrounds pinion shaft 52, pinion spring 53 does not contact pinion shaft 52 or pinion 58 as pinion shaft 52 and pinion 58 are moved out of engagement with the engine flywheel. Instead, contact member 55 positioned within plunger 113 is utilized to pick up pinion shaft 52 to move pinion shaft 52, which in turn moves pinion 58 into and out of engagement with ring gear 10 of the engine flywheel.

In addition, as shown in FIGS. 11 and 12, to prevent run-on of electrical motor 30 in the situation when the engine fails to start, plunger 113 is capable of moving independent of pinion shaft 52. Thus, plunger 113 may move to break the electrical connection between moveable contact 142 and fixed contacts 144*a*, 144*b*, while pinion 58 is still in engagement with ring gear 10 of the engine flywheel.

Once the electrical connection between moveable contact 142 and fixed contacts 144*a*, 144*b* is broken, electrical current no longer runs to motor 30. This causes the rotation of armature shaft 32 to decrease, thereby decreasing the amount of the axial thrust force that is pulling pinion 58 into engagement with ring gear 10 when motor 30 is running. At some point in time, the axial thrust force is decreased sufficiently such that return spring 53 begins to move pinion shaft 52, through contact member 55, to disengage pinion 58 from ring gear 10.

Additional advantages and modifications will readily occur to those of ordinary skill in the art. The invention therefore is not limited to the specific details and embodiments shown and described above. Departures may be made from such details without departing from the spirit or scope of the invention. The scope of the invention is established by the claims and their legal equivalents.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A starter motor assembly comprising:

a housing;

an electrical motor provided in the housing having a rotatable armature shaft;

a rotatable drive shaft engageably linked with the armature shaft;

a pinion assembly provided in the housing engageable at one end with the drive shaft and including a pinion at the other end engageable with a flywheel of an engine;

a solenoid assembly provided in the housing for selectively energizing the electrical motor, wherein the solenoid assembly is coaxial with the drive shaft, the solenoid assembly including a plunger having a bore, the plunger being engageable with the pinion assembly to move the pinion assembly including the pinion into engagement with the flywheel; and a return spring positioned at least in part within the bore of the plunger of the solenoid assembly for moving the pinion assembly including the pinion away from engagement with the flywheel, wherein the return spring is spaced from the pinion assembly;

wherein energization of the solenoid assembly moves the plunger to move the pinion assembly to engage the pinion with the flywheel; and wherein upon deenergization of the solenoid assembly, the return spring moves the pinion assembly which moves the pinion from engagement with the flywheel.

2. The starter motor assembly of claim 1, further comprising a contact member, the contact member engaging the plunger and engaging the pinion assembly so that movement of the plunger moves the pinion assembly, the contact member being positioned within the bore of the plunger and contacting a contact surface of the plunger, the contact member further being positioned within a groove formed around an external surface of the pinion assembly;

wherein a first end of the return spring pushes against the contact member; and wherein upon deenergization of the solenoid assembly, the return spring moves the contact member which in turn moves the pinion assembly to move the pinion from engagement with the flywheel.

3. The starter motor assembly of claim 2, wherein the contact member is penannular in shape.

4. The starter motor assembly of claim 2, wherein the contact member is annular in shape.

5. The starter motor assembly of claim 2, wherein the contact member is made of case hardened steel.

6. The starter motor assembly of claim 2, wherein the contact member is made of stainless steel.

7. The starter motor assembly of claim 2, wherein the contact member is made of brass.

8. The starter motor assembly of claim 2, further comprising a plunger stop assembly provided around the pinion assembly, the plunger stop assembly including a groove formed in a surface opposite a surface facing the flywheel, and wherein a second end of the return spring which is opposite the first end of the return spring pushes against the groove formed in the plunger stop assembly.

9. The starter motor assembly of claim 1, wherein the rotatable drive shaft is part of a planetary gear assembly provided in the housing, the planetary gear assembly including a plurality of planetary gears engaged with the armature shaft, each planetary gear being rotatable on a respective pin, the pins being linked to the rotatable drive shaft.

10. The starter motor assembly of claim 9, further comprising a clutch assembly provided in the housing engageable with the drive shaft of the planetary gear assembly and the armature shaft, the clutch assembly having an inner clutch piece, an integrated clutch shell including an outer clutch piece, and rotation control means provided between the outer clutch piece and the inner clutch piece for preventing rotation of the inner clutch piece in a first direction and allowing rotation of the inner clutch piece in a second direction.

11. A starter motor assembly comprising:

a housing;

an electrical motor provided in the housing having a rotatable armature shaft;

a rotatable drive shaft engageably linked to the armature shaft;

a pinion assembly provided in the housing, the pinion assembly including a pinion shaft, the pinion shaft engageable at one end with the drive shaft and including a pinion at the other end engageable with a flywheel of an engine, and the pinion shaft including a groove formed around an external surface of the pinion shaft;

a solenoid assembly provided in the housing for selectively energizing the electrical motor, wherein the solenoid assembly is coaxial with the drive shaft, the solenoid assembly including a plunger having a bore, the plunger being engageable with the pinion assembly to move the pinion into engagement with the flywheel;

a return spring positioned around the pinion shaft without contacting the pinion shaft, the return spring being positioned at least in part within the bore of the plunger of the solenoid assembly; and a contact member positioned within the groove formed around the external surface of the pinion shaft, the contact member also being positioned within the bore of the plunger of the solenoid assembly;

wherein energization of the solenoid assembly moves the plunger which in turn moves the contact member which in turn moves the pinion assembly to thereby engage the pinion with the flywheel; and wherein upon deenergization of the solenoid assembly, the return spring moves the contact member which in turn moves the pinion assembly to move the pinion from engagement with the flywheel.

12. The starter motor assembly of claim 11, wherein the contact member is penannular in shape.

13. The starter motor assembly of claim 11, wherein the contact member is annular in shape.

14. The starter motor assembly of claim 11, wherein the contact member is made of case hardened steel.

15. The starter motor assembly of claim 11, wherein the contact member is made of stainless steel.

16. The starter motor assembly of claim 11, wherein the contact member is made of brass.

17. The starter motor assembly of claim 11, further comprising a plunger stop assembly provided around the pinion assembly, the plunger stop assembly including a groove formed in a surface opposite the surface facing the flywheel, and wherein one end of the return spring pushes against the groove of the plunger stop assembly.

18. The starter motor assembly of claim 11, wherein the drive shaft is part of a planetary gear assembly provided in the housing, the planetary gear assembly including a plurality of planetary gears engaged with the armature shaft, each planetary gear being rotatable on a respective pin, the pins being linked to the rotatable drive shaft.

19. The starter motor assembly of claim 18, further comprising a clutch assembly provided in the housing engageable with the drive shaft of the planetary gear assembly and the armature shaft, the clutch assembly having an inner clutch piece, an integrated clutch shell including an outer clutch piece, and rotation control means provided between the outer clutch piece and the inner clutch piece for preventing rotation of the inner clutch piece in a first direction and allowing rotation of the inner clutch piece in a second direction.

20. A starter motor assembly comprising:

a housing;

an electrical motor provided in the housing having a rotatable armature shaft;

a planetary gear assembly providing in the housing, the planetary gear assembly including a rotatable drive shaft engageably linked to the armature shaft, the planetary gear assembly further including a plurality of planetary gears engaged with the armature shaft, each planetary gear being rotatable on a respective pin, the pins being linked to the rotatable drive shaft;

a pinion assembly provided in the housing, the pinion assembly including a pinion shaft, the pinion shaft engageable at one end with the drive shaft and including a pinion at the other end engageable with a flywheel of an engine, and the pinion shaft including a groove formed around an external surface of the pinion shaft;

a solenoid assembly provided in the housing for selectively energizing the electrical motor, wherein the solenoid assembly is coaxial with the drive shaft, the solenoid assembly including a plunger having a bore, the plunger being engageable with the pinion assembly to move the pinion into engagement with the flywheel;

a return spring positioned around the pinion shaft without contacting the pinion shaft, the return spring being positioned at least in part within the bore of the plunger of the solenoid assembly;

a contact member positioned within the groove formed around the external surface of the pinion shaft, the contact member also being positioned within the bore of the plunger of the solenoid assembly; and a plunger stop assembly provided around the pinion assembly, the plunger stop assembly including a groove formed in a surface opposite the surface facing the flywheel, and wherein one end of the return spring pushes against the groove of the plunger stop assembly;

wherein energization of the solenoid assembly moves the plunger which in turn moves the contact member which in turn moves the pinion assembly to thereby engage the pinion with the flywheel; and wherein upon deenergization of the solenoid assembly, the return spring moves the contact member which in turn moves the pinion assembly to move the pinion from engagement with the flywheel.

21. The starter motor assembly of claim 20, wherein the contact member is penannular in shape.

22. The starter motor assembly of claim 20, wherein the contact member is annular in shape.

23. The starter motor assembly of claim 20, wherein the contact member is made of case hardened steel.

24. The starter motor assembly of claim 20, wherein the contact member is made of stainless steel.

25. The starter motor assembly of claim 20, wherein the contact member is made of brass.

26. The starter motor assembly of claim 20, further comprising a clutch assembly provided in the housing engageable with the drive shaft of the planetary gear assembly and the armature shaft, the clutch assembly having an inner clutch piece, an integrated clutch shell including an outer clutch piece, and rotation control means provided between the outer clutch piece and the inner clutch piece for preventing rotation of the inner clutch piece in a first direction and allowing rotation of the inner clutch piece in a second direction.

* * * * *